United States Patent
Krishnan et al.

(10) Patent No.: US 12,321,482 B2
(45) Date of Patent: Jun. 3, 2025

(54) SYSTEM AND METHOD FOR RECOMMENDING SECURE TRANSFER MEASURES FOR PERSONAL IDENTIFIABLE INFORMATION IN INTEGRATION PROCESS DATA TRANSFERS

(71) Applicant: BOOMI, INC., Round Rock, TX (US)

(72) Inventors: Ravikiran Krishnan, Foster City, CA (US); Prakhar Amlathe, Foster City, CA (US)

(73) Assignee: BOOMI, LP, Chesterbrook, PA (US)

( * ) Notice: Subject to any disclaimer, the term of this patent is extended or adjusted under 35 U.S.C. 154(b) by 1138 days.

(21) Appl. No.: 17/085,529

(22) Filed: Oct. 30, 2020

(65) Prior Publication Data

US 2022/0138345 A1    May 5, 2022

(51) Int. Cl.
| | |
|---|---|
| *G06N 3/08* | (2023.01) |
| *G06F 18/211* | (2023.01) |
| *G06F 18/23213* | (2023.01) |
| *G06F 21/62* | (2013.01) |
| *G06N 3/084* | (2023.01) |
| *G06N 3/09* | (2023.01) |
| *G06N 20/00* | (2019.01) |

(52) U.S. Cl.
CPC ........ *G06F 21/6245* (2013.01); *G06F 18/211* (2023.01); *G06F 18/23213* (2023.01); *G06N 3/08* (2013.01); *G06N 3/084* (2013.01); *G06N 3/09* (2023.01); *G06N 20/00* (2019.01)

(58) Field of Classification Search
CPC ...................................................... G06N 3/08
See application file for complete search history.

(56) References Cited

U.S. PATENT DOCUMENTS 9,665,628 B1 *  5/2017  Dubey .................. G06F 16/185
10,585,989 B1 *  3/2020  Ahmed .................. G06N 3/045
(Continued)

OTHER PUBLICATIONS

Goel et al ("Integration of data analytics with cloud services for safer process systems, application examples and implementation challenges" Oct. 2020) (Year: 2020).*

*Primary Examiner* — Lut Wong
(74) *Attorney, Agent, or Firm* — Prol Intellectual Property Law, PLLC; H. Kenneth Prol

(57) ABSTRACT

An information handling system operating a personal identifiable information (PII) recommendation system may comprise a GUI modelling with visual integration elements, an integration process flow for migrating field values comprising PII data, wherein the integration process applies a security measure to migration of PII data, a processor executing code instructions to generate a migrating field value term frequency vector describing a weighted frequency with which a metadata term for the migrating field value appears within a metadata for a migrating dataset comprising the migrating field value, input the term frequency vector into a trained neural network to determine the migrating field value includes PII data, label the migrating field value as PII data, such that the modeled integration process applies the security measure to the migrating field value, and a network interface device transmitting a set of connector code instructions for performing the modeled integration process for remote execution.

13 Claims, 10 Drawing Sheets

(56) References Cited

U.S. PATENT DOCUMENTS

| | | | |
|---|---|---|---|
| 2016/0080397 A1* | 3/2016 | Bacastow | H04L 63/1433 |
| | | | 726/1 |
| 2018/0167490 A1* | 6/2018 | Morton | G06F 3/167 |
| 2019/0272387 A1* | 9/2019 | Gkoulalas-Divanis | |
| | | | G06F 21/604 |
| 2020/0250139 A1* | 8/2020 | Muffat | G06V 30/1988 |
| 2020/0285771 A1* | 9/2020 | Dey | G06F 21/6272 |

* cited by examiner

| Source abc | Shipping Address abc | Date 📅 | SSN 123 | CC_number 123 |
|---|---|---|---|---|
| public | 123 Main St. Austin, TX | Aug 3, 2018 \| 2:30 pm | 123-45-6789 | 1234-567-8901 |
| REST | 123 Congress Ave. Austin, TX | Sep 14, 2000 \| 6:00 am | 135791357 | 0123-456-7890 |
| googleanalytics | 123 Campus St. Austin, TX | Jan 30, 2010 \| 5:12 pm | 987 65 4321 | 9876-543-2109 |

Dataset Explorer | customer_demo_data ▼ | 🔍 Search Datasets, Jobs, Schedules, Users and more | ⓘ ▢ ⋮ | CANCEL SAVE 510
Source    abc
─────⊙─
public
REST
googleanalytics 520
Shipping Address    abc
─────────────
123 Main St. Austin, TX
123 Congress Ave. Austin, TX
123 Campus St. Austin, TX 530
Date    🗓
──⊙──────
Aug 3, 2018 | 2:30 pm
Sep 14, 2000 | 6:00 am
Jan 30, 2010 | 5:12 pm 540
| SSN          123 | CC_number   123 |
|------------------|------------------|
| 123-45-6789      | 1234-567-8901    |
| 135791357        | 0123-456-7890    |
| 987 65 4321      | 9876-543-2109    |
550

560
SAMPLE STATISTICS                    ✦  ✕
34 Rows              05 Columns
02 Avg. Row Width    01 PII Columns

| ☐ COLUMN NAME | TYPE |
|---|---|
| ☐ Source | abc  string  › |
| ☑ Shipping Address | abc  string  › |
| ☐ Date | 🗓  string  › |
| ☐ SSN | 123  integer  › |
| ☑ CC_number | 123  CC  ‹ |

PII (1)

570 → Source row
571 → Shipping Address row
572 → CC_number row

FIG. 5B

SYSTEM AND METHOD FOR RECOMMENDING SECURE TRANSFER MEASURES FOR PERSONAL IDENTIFIABLE INFORMATION IN INTEGRATION PROCESS DATA TRANSFERS

FIELD OF THE DISCLOSURE

The present disclosure relates generally to a system and method for deploying and executing customized data integration processes. More specifically, the present disclosure relates to recommending application of security measures to the transfer of data containing personal identifiable information within a customized data integration process.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 5A is a graphical diagram illustrating a migrating dataset explorer GUI for reviewing a dataset for migration according to an embodiment of the present disclosure;

FIG. 5B is a graphical diagram illustrating a migrated dataset explorer GUI for labeling of field values as PII data according to an embodiment of the present disclosure;

The use of the same reference symbols in different drawings may indicate similar or identical items.

DETAILED DESCRIPTION

Figure 1:
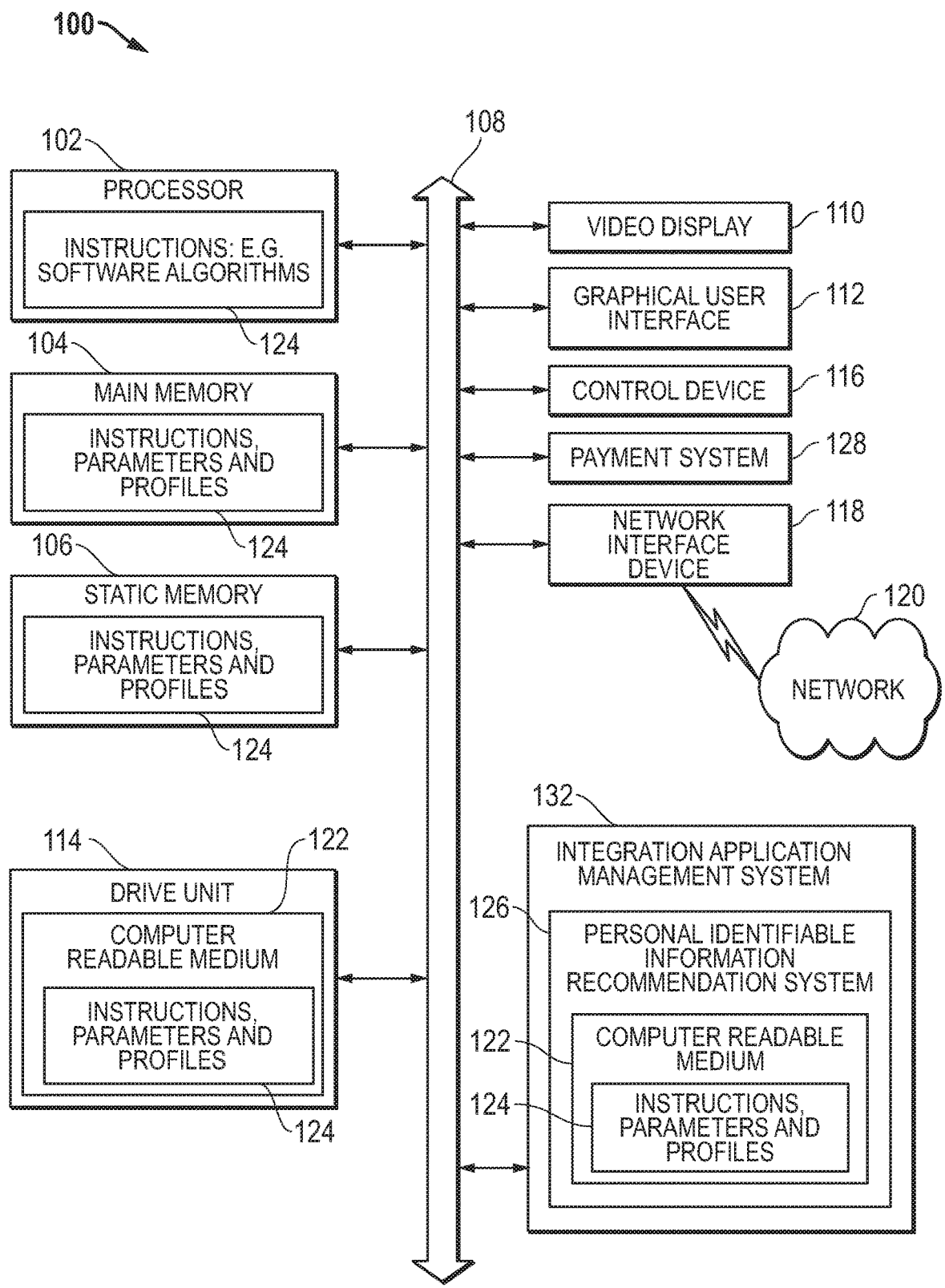
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses or customers. Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using an integration process modeling graphical user interface (GUI) that allows a user to model each step of the data sharing among the various businesses, using visual icons or "shapes" representing units of work to be performed within the integration process, such as integration process connectors. An integration application management system managing such an integration process modeling GUI in embodiments described herein may generate the code instructions for performing this necessary customization of an integration process for a particular user's needs, and transmit these code instructions, along with a runtime engine for remote execution of those code instructions at another location, for example, within an enterprise user's network, or in a cloud computing environment. In such a way, users may customize integration processes using these visual integration elements or shapes connected together in steps to form an end to end business integration process, without having to learn the underlying computer language that will execute these steps.

Users of the integration process modeling GUI may model several integration processes, some of which may apply security measures to prevent sharing of data containing personal identifiable information (PII). Such personal identifiable information may include names, contact information (e.g., addresses), payment information (e.g., credit card numbers), or social security numbers, for example. Personal identifiable information may also include information or data protected by privacy laws. For example, medical information including diagnoses, or diagnostic codes may be considered PII data in some scenarios. Users of the integration process modeling GUI in embodiments may further identify other business integration data as containing PII data, at the discretion of the user.

Businesses engaging in such data integration processes may have a vested interest in protecting such PII data. For example, the European Union (EU) has recently enacted the General Data Protection Regulation (GDPR), which dictates requirements for processing of personal data of EU individuals. In short, enterprises doing business within the EU may be required to adhere to the GDPR, or face stiff fines or penalties. The GDPR contains several provisions requiring controllers of personal data (e.g., enterprises engaged in data integration processes) to place an appropriate technical and organization measures to implement data protection principles.

In order to provide such protection, users of the integration process modeling GUI in embodiments may apply security measures to data identified as containing PII. For example, users may inhibit the transfer of PII data to certain trading partners, physical locations, or applications. In another example, users may allow such a transfer, but may permanently mask or remove portions of such data during the migration process. However, in order for such security measures to adequately protect PII data from inappropriate or unsecure transfer, PII data must be accurately identified such that the security measures may be applied during the migration process. A system is needed to assist the user of the integration process modeling GUI in identifying all data being migrated pursuant to an integration process that contains PII.

A PII recommendation system in embodiments of the present disclosure address this issue by suggesting the labeling of specific field values as containing PII data, based on comparison by a feed-forward neural network of metadata properties for previously migrated PII field values and for field values to be migrated in the future, based on a currently modeled integration process. Such a neural network may be trained to associate certain metadata properties of a field value or to associate unstructured data content in a field value with a greater or lesser likelihood the field value contains PII data. By inputting the metadata properties for a field value yet to be migrated into such a trained neural network, the PII recommendation system in embodiments described herein may determine the likelihood that the field value yet to be migrated also contains PII data. The PII recommendation system in embodiments may further prompt the user of the integration process modeling GUI to label such a field value as PII, if the likelihood meets a preset threshold, such that the currently modeled integration process applies the security measures built into the modeled integration process to the field value marked as PII data. In such a way, the PII recommendation system may assist the user of the integration process modeling GUI to apply security measures to all field values that may contain PII data.

The neural network in embodiments may determine a field value (e.g., a cell within a table of information, or a field value associated with a field name that is also associated with several other field values) contains PII data, based on metadata describing the contents or formatting of the field value itself, among other properties. For example, the PII data recommendation system in embodiments may be capable of determining that unstructured data in a field value (e.g., data not associated with any known data model or formatting standard) contains PII data.

The PII recommendation system in embodiments described herein may also assist users of the integration process modeling GUI in identifying an effective security measure to apply to PII data during migration. For example, the PII recommendation system may identify a masking function or method of partially or wholly redacting PII data given within an individual field value. Such a recommendation may be made based on an identification of masking functions applied in the same or other integration processes to similar field values in some embodiments. The determination of such a "similarity" in embodiments may be made by the PII recommendation system using an unsupervised vector quantization method, such as, for example, a K-means clustering algorithm applied to the field value metadata properties of several field values. In such a way, the PII recommendation system in embodiments may suggest masking functions, redaction methods to apply to field values identified as containing PII data, or otherwise inhibit unsecure transfer of personal information.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the personal identifiable information (PII) recommendation system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the PII recommendation system 126, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the PII recommendation system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the PII recommendation system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, or gesture or touch screen input.

The information handling system 100 may further include a graphical user interface 112. The graphical user interface 112 in an embodiment may provide a visual designer environment permitting a user to define process flows between applications/systems, such as between trading partner and enterprise systems, and to model a customized business integration process. The graphical user interface 112 in an embodiment may provide a menu of pre-defined user-selectable visual integration elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set. The graphical user interface 112 in an embodiment may include a PII data labeling graphical user interface, or an integration process modeling graphical user interface in various embodiments described in greater detail herein.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer-based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. Such an operating system (e.g., Microsoft® Windows® OS, Linux® OS, Apple® iOS®, or Apple® MacOS®) may facilitate execution of the code instructions 124, including code instructions for the integration application management system 132 and the PII recommendation system 126.

In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce™ or Oracle's™ NetSuite™), or an API adhering to a known open source specification (e.g., Swagger™) may enable application programs 124 to interact or integrate operations with one another.

In an example of the present disclosure, instructions 124 may execute software for identifying, within a field value, personal identifiable information (PII) based on analysis by a feed-forward neural network (e.g., multilayer perceptron (MLP) neural network) of metadata properties for field values previously identified as containing PII data. Instructions 124 may also execute an unsupervised vector quantization method (e.g., k-means clustering algorithm) to categorize field values based on metadata properties in order to suggest masking functions be applied to all field values marked as containing PII within the same identified category or cluster. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the PII recommendation system 126, or the integration application management system 132 may include a computer-readable medium 122 such as a magnetic disk, or a solid-state disk in an example embodiment. The computer-readable medium of the memory 104, storage devices 106 and 114, the PII recommendation system 126, or the integration application management system 132 may store one or more sets of instructions 124, such as software code corresponding to the present disclosure.

The disk drive unit 114, static memory 106, and computer readable medium 122 of the PII recommendation system 126, or the integration application management system 132 also contain space for data storage such as an information handling system for suggesting labeling of field values as containing PII data, or suggesting security measures to apply to such labeled data. Connector code sets, and trading partner code sets may also be stored in part in the disk drive unit 114, static memory 106, or computer readable medium 122 of the PII recommendation system 126, or the integration application management system 132 in an embodiment. In other embodiments, data profile code sets, and run-time engines may also be stored in part or in full in the disk drive unit 114, static memory 106, or computer readable medium 122 of the PII recommendation system 126, or the integration application management system 132. Further, the instructions 124 of the PII recommendation system 126, or the integration application management system 132 may embody one or more of the methods or logic as described herein.

In a particular embodiment, the instructions, parameters, and profiles 124, and the PII recommendation system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the PII recommendation system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly.

The PII recommendation system 126, or the integration application management system 132 may also contain or be stored and executed with computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the PII recommendation system 126, or the integration application management system 132, which may be operably connected to the bus 108. The PII recommendation system 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card)), or a system (such as a motherboard, a system-on-a-chip (SoC)), or a stand-alone device). The system, device, or module can include software, including firmware embedded at a device, such as an Intel® Core and Xeon class processor, ARM (ID brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the PII recommendation system 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
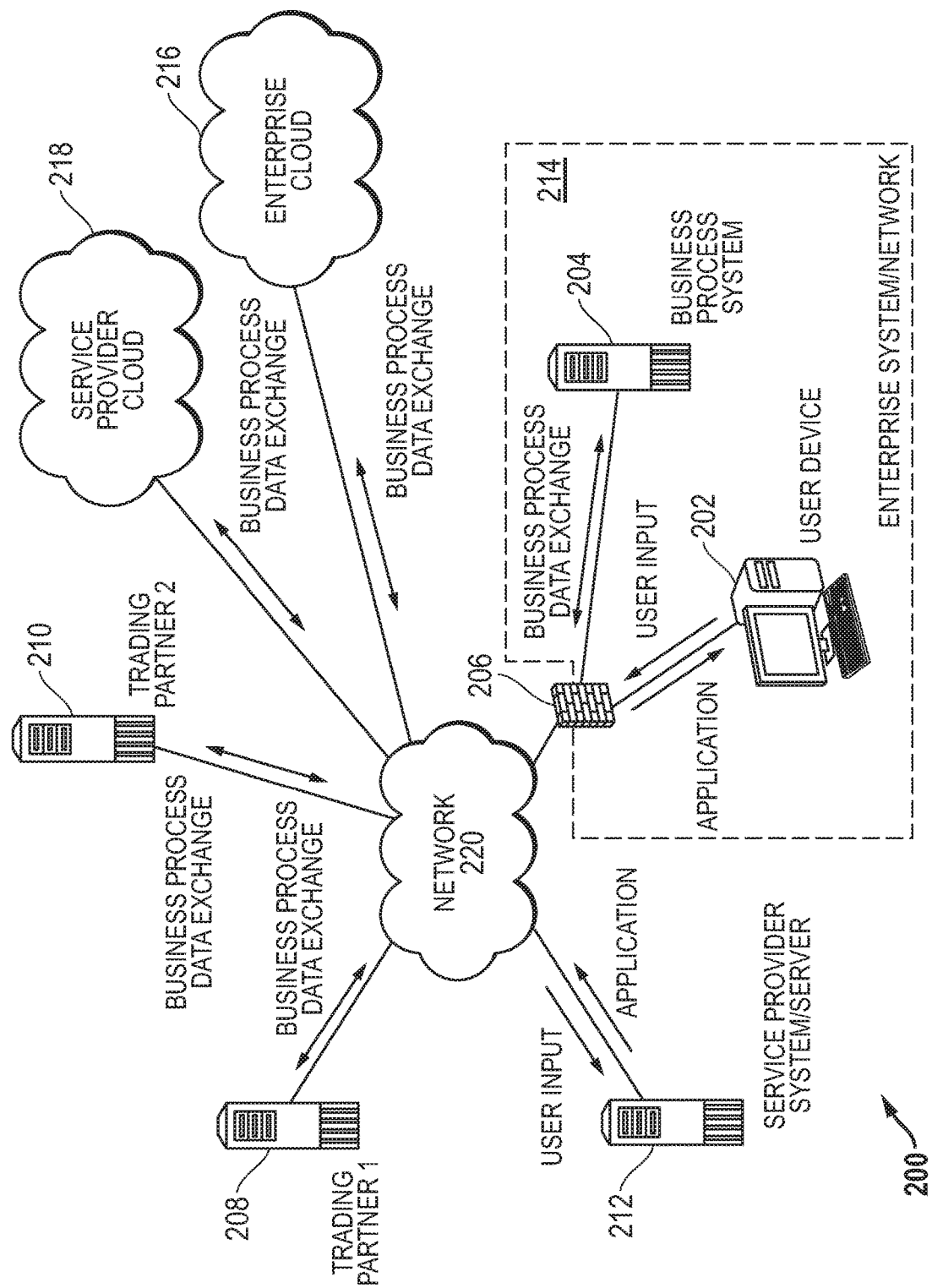
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. As described herein, current methods of transacting business between or among a plurality of business entities involve the use of multiple software applications, application programming interfaces (APIs), or integration processes customized to a particular business or application to transfer shared data among the plurality of businesses or customers. Such customization in an embodiment may be performed using an integration process modeling GUI hosted by the service provider system/server 212 that allows a user to model each step of the data sharing among the various businesses, using visual icons or "elements" representing units of work to be performed within the integration process, such as integration process connectors, as described in greater detail with respect to FIG. 3.

An integration application management system operated at the service provider system/server 212 managing such an integration process modeling GUI in embodiments described herein may generate the code instructions for performing this necessary customization of an integration process for a particular user's needs, and transmit these code instructions, along with a runtime engine for remote execution of those code instructions at another location, for example, within an enterprise user's network 214, or in a cloud computing environment (e.g., service provider cloud 218 or enterprise cloud 216).

As also described herein, users of the integration process modeling GUI hosted at the service provider system/server 212 in an embodiment may model several integration processes, some of which may apply security measures to prevent sharing of data containing personal identifiable information (PII) with certain trading partners (e.g., trading partner 208 or trading partner 210), within certain geographic locations, or with certain applications. For example, such security measures may include partially or wholly redacting, removing, or masking specifically identified field values, or terminating the transfer of such field values to specifically identified locations (e.g., geographic locations, certain trading partners, or specific applications). Businesses engaging in such data integration processes may have a vested interest in protecting PII data, in order to, for example, comply with GDPR requirements.

Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user or the automated data set query suggestion system to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a data set field value may be transferred, according to embodiments described herein, may be located remotely from the enterprise system 214, at a service provider cloud location 218, or an enterprise cloud location 216.

A single integration process in some embodiments may include transfer of a single field value between the enterprise system/network 214 and a plurality of trading partners (e.g., 208 and 210). In other embodiments, a single integration process may include transfer of a single field value between the enterprise system/network 214 and a plurality of applications (e.g., QuickBooks, SalesForce's™ CRM Platform, Oracle's™ Netsuite ERP Platform, Infor'S™ WMS Application). In still other embodiments, a single integration process may include transfer of a single field value between or among the enterprise system/network 214, one or more trading partners, and one or more applications. An enterprise system/network 214 in an embodiment may also repeatedly execute the same integration process (e.g., as modeled with respect to FIG. 3), or may execute one or more of a plurality of different integration processes involving plural field values of a dataset to be migrated in embodiments. Further, plural integration processes may each be associated with a different flow model. Finally, the service provider system/server 212 may manage integration process modeling for a plurality of enterprise system/networks (e.g., 214), which may also repeatedly execute a single integration process or a plurality of integration processes. The service provider system/server 212 in such an embodiment may receive execution files from each of the plurality of enterprise system/networks (e.g., 214), describing the field values migrated during each of these executions, and identifying field values each user has marked as containing PII data. As described in greater detail herein, the metadata contained in these execution files may be combined or crowd-sourced to generate one or more test migrated datasets the PII recommendation system may use to train a neural network to associate certain metadata terms or data terms within field values with a likelihood these terms indicate the field value associated with or containing such a term includes PII data.

The service provider server/system 212 in an embodiment may host the PII recommendation system described herein. Following training of the neural network described directly above, the PII recommendation system in an embodiment may operate to assist users of the integration process modeling GUI (also hosted by the service provider server/system 212) in identifying data to be migrated pursuant to modeled integration process as containing PII data, and applying security measures to inhibit the unsecure transfer of such information (e.g., to unsecure trading partners, locations, or applications).

The integration process-modeling user interface in an embodiment may model one or more business process data exchanges via network 120 within an integration process by adding one or more visual integration elements representing connector code sets to an integration process flow. These visual integration elements in an embodiment may model the ways in which a user wishes data to be accessed, moved, and/or manipulated during the one or more business process data exchanges, pursuant to underlying connector code sets associated with these visual integration elements. Each visual integration element the user adds to the integration process flow diagram in an embodiment may be associated with a pre-defined subset of code instructions (e.g., connector code sets) stored at the service provider systems/server 212 in an embodiment. Upon the user modeling the integration process, the service provide system/server 212 in an embodiment may generate a run-time engine capable of executing the pre-defined subsets of code instructions represented by the visual integration elements chosen by the user. The runtime engine may then execute the subsets of code instructions in the order defined by the modeled flow of the visual integration elements given in the integration process flow diagram.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite account. In such an embodiment, the enterprise system 214 may initiate business process data exchanges between itself, the SalesForce™ CRM service provider and the Oracle™ Netsuite service provider.

Figure 3:
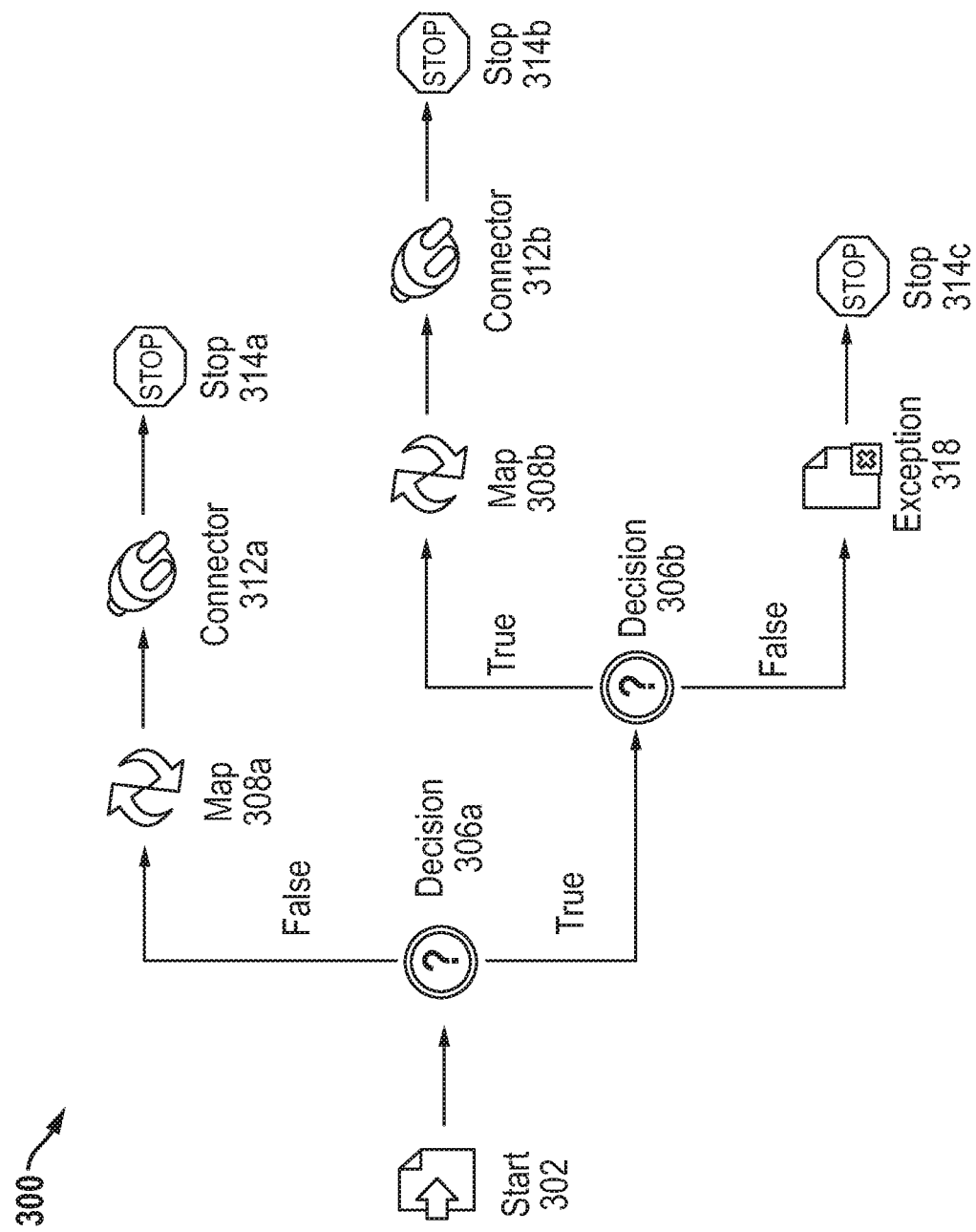
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records comprising a migration dataset according to an embodiment of the present disclosure. As described herein, users of an integration process modeling graphical user interface (GUI) 300 may model several integration processes, some of which may apply security measures to prevent sharing of data containing personal identifiable information (PII). Such PII data may be used to positively identify an individual. For example, PII data may include information such as individual names, identifying account or social security numbers, date of birth, address, employer name, etc. Businesses engaging in such data integration processes may have a vested interest in protecting such PII data, for example, by inhibiting the transfer of such data, or portions thereof, to unsecure trading partners, geographic locations, or applications. Users of the integration process modeling GUI 300 in an embodiment may provide such security measures by routing the flow of the integration process for data identified as containing PII, using the plurality of visual integration elements described herein, to avoid transfer to such unsecure trading partners or geographic locations, or by applying a masking function or redaction method to part or all of the data marked as containing PII data.

The flow diagram in an embodiment may be displayed within the integration process modeling GUI 300 that allows the user to build the process flow, and view previously built process flow diagrams. A user may generate a flow diagram in an embodiment by providing a chronology of process-representing integration elements, via the use of the integration process-modeling user interface. In some embodiments, the integration process-modeling user interface may take the form of a visual user interface (e.g., GUI 300). In such embodiments, the user-selectable elements representing integration sub-processes (e.g. connector integration elements) may be visual icons.

An integration process modeling GUI 300 in an embodiment may provide a design environment permitting a user to define process flows between applications/systems, such as between trading partner and enterprise systems, between on-site data centers and cloud-based storage modules, or between multiple applications, and to model a customized business integration process. A process flow in an embodiment may illustrate a migration or transfer of data from a source (e.g., an enterprise network/system or cloud-based account of the enterprise) to a destination (e.g., a server maintained by a trading partner, or a cloud-based account managed by either a trading partner or the enterprise). The data migrated in such a way may comprise a field value associated with a field name. A plurality of such field values (either all associated with the same field name as can be illustrated as a single column, or associated with a plurality of field names as can be illustrated as a table) may form a dataset for a single execution of the integration process modeled via the GUI 300. Each field value of a dataset to be migrated pursuant to the modeled integration process in an embodiment may be associated with a PII status, such that a portion of the field values within the dataset for the integration process are marked as containing PII data, while the remainder of the field values within the dataset are not marked as containing PII data.

Each field value in an embodiment may also be associated with metadata describing various attributes of the field value. For example, metadata for a single field value in an embodiment may include a date of creation, date of last modification, or date of last migration. As another example, metadata may include the contents of the field value itself, as well as the field name associated with the field value. As yet another example, metadata may include a list of locations at which the field value has been stored during execution of the current or previously executed integration processes. In still another example, metadata may identify the field value type describing the formatting of the contents of the field value, which may include, for example, string, integer, social security number, or credit card. These are only a few examples of field value types, which may be pre-defined by an administrator of the PII recommendation system or the integration application management system in an embodiment. Other examples may identify any commonly stored field value, such as, for example, date of birth, diagnostic codes, addresses (e.g., physical, business, home, or shipping). Metadata from each of the field values within a dataset may be combined in an embodiment to form a totality of metadata for the dataset.

The PII recommendation system in an embodiment may operate, in part, to analyze the totality of the metadata of a dataset to be migrated to identify terms frequently represented in metadata for field values marked as PII data. For example, the PII recommendation system may generate a term frequency vector for each of a plurality of terms identified within metadata for a single field value, wherein each value of the term frequency vector describes a weighted frequency with which one of the plurality of terms occurs within the field value itself and the totality of the metadata of a dataset to be migrated. In addition, the PII recommendation system may access a plurality of previously migrated datasets, referred to herein as test migrated datasets, in which at least a portion of the field values therein (referred to herein as test migrated field values) have been labeled as PII data. The PII recommendation system may then cross-correlate these previously applied PII data labels to the term frequency vectors to determine a likelihood that inclusion of a single term within metadata for a test migrated field value indicates the test migrated field value contains PII data.

For example, the PII recommendation system may train a feed-forward neural network to make such a cross-correlation. The PII recommendation system in such an embodiment may perform several training sessions in an embodiment. Each such training session may involve the inputting of a term frequency vector for a given dataset into a multi-layered neural network, where each value within the term frequency vector constitutes an input node. Such a training session may then output, for each term represented by the term frequency vector, a binary (0 or 1) indication of whether the test migrated field value containing that term includes PII data, where each binary value represents an output node. These output node values may then be compared against known PII statuses (e.g., either marked as PII and associated with a value of 1, or not marked as PII and associated with a value of 0) for each of the test migrated field values contained within the test migrated dataset, to produce an error function for each output node of the neural network. The training session may then proceed by back-propagating the error functions for each node through the neural network, and adjusting the weight matrices of each layer of the neural network to minimize the error function. The PII recommendation system in such an embodiment may proceed to forward and back-propagate the error functions in such a way until the error functions for each of the output nodes reach a preset minimum threshold (e.g., 1%, 3%, 0.5%). Upon reaching such a threshold for each of the output nodes, the weight matrices may be tuned to accurately model the known relationship between each of the terms represented within the input term frequency vector, and the known PII status of the test migrated field value whose metadata contain those terms. The training session for a single test migrated field value for a single dataset may then end. The neural network in an embodiment may be trained in such a way by repeating such a training session for several test migrated field values (e.g., all test migrated field values within a given test migrated dataset), or across several test migrated datasets (e.g., each containing a plurality of test migrated field values). The term may be metadata terms associated with the field value or terms in unstructured or structured data content within the field value in such a way, the PII recommendation system may determine a probability that inclusion of a single term within metadata for a single field value or within the data content of the single field value indicates the field value contains PII data.

Once the feed-forward neural network in an embodiment is trained to determine a likelihood that inclusion of a single term within metadata for a single field value content data or within the single field value indicates the field value contains PII data, as described directly above, the PII recommendation system may apply the neural network to an unmigrated dataset to determine whether the unmigrated field values within the unmigrated dataset may contain PII data. This may occur prior to execution of the integration process for migrating such data, so that the user of the integration process modeling GUI 300 may design the migration to apply certain security measures to field values identified as containing PII data. The user in such an embodiment may design the process flow for the migration of such data to include these security measures, for example, using the integration process modeling GUI 300.

An integration process modeling GUI 300 in an embodiment may provide a menu of pre-defined user-selectable elements representing integration sub-processes and permit the user to arrange them as appropriate to model a full integration process. For example, the elements may include visual, drag-and-drop icons (known as "visual integration elements") representing specific units of work required as part of the integration process. Such visual integration elements in an embodiment may represent units of work such as invoking an application-specific connector to access, and/or manipulate data. In other embodiments, visual integration elements may represent tasks relating to transforming data from one format to another, routing data down multiple paths of execution by examining the contents of the data, business logic validation of the data being processed, etc.

Each unit of work (known as "process components"), as represented by a visual integration element, may be identifiable by a process component type, and may further include an action to be taken. For example, a process component may be identified as a "connector" component. Each "connector" component representing visual integration element, when chosen and added to the process flow in the integration process modeling GUI 300, may allow the user to choose from different actions the "connector" component may be capable of taking on the data as it enters that process step. Further the integration-process modeling user interface in an embodiment may allow the user to choose the field value upon which the action will be taken. The action and data element the user chooses may be associated with a connector code set, via the integration application management system, which may be pre-defined and stored at a system provider's memory in an embodiment. The integration application management system operating at least partially at a system provider server/system in an embodiment may generate a dynamic runtime engine for executing these pre-defined subsets of code instructions correlated to each individual visual integration element (representing a process component) in a given flow diagram in the order in which they are modeled in the given flow diagram.

As shown in FIG. 3, such process-representing visual integration elements may include a start element 302, a decision element 306a or 306b, a map element 308a or 308b, a connector element 312a or 312b, an exception element 318, and a stop element 314a, 314b, or 314c. Other embodiments may also include a branch element, a data process element, a message element, a set properties element, or a process call element, for example. A connector element 312a or 312b, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 314a, 314b, or 314c may operate to end a process flow. Each visual integration element may require user input in order for a particular enterprise or trading partner to use the resulting process. The start element 302 in an embodiment may further allow or require the user to provide data attributes unique to the user's specific integration process, such as, for example, the source of incoming data to be integrated, and the data to be so integrated. For example, a start element 302 may identify one or more field values, each associated with a field name, that are to be migrated pursuant to the integration process modeled in FIG. 3.

The decision element 306a in such an embodiment may route incoming data model field values based on whether they meet a preset criterion. For example, the decision element 306a may be associated with a statement, such as, "the incoming field value is labeled as containing PII." If such an assigned statement proves true (e.g., the incoming field value has been marked as containing PII), the decision element 306a may route the integration process including that field value toward decision element 306b, which may operate to apply added security, such as a partial or full redaction of the field value to the integration process. If such an assigned statement proves false, this may indicate the incoming data model value likely does not contain personal identifiable information, and the decision element 306a may route the integration process toward the map element 308a, for more direct delivery to the destination defined at connector 312a.

A map element 308a in an embodiment may associate a first field name for a field value being retrieved from a first application or source with a second field name under which that same field value will be stored at a second application or destination. A user may also provide a "function" that manipulates the field value or field name for a specific purpose prior to transmission of the field value to the second application or destination. For example, a conversion function may convert a field value containing a temperature reading in Fahrenheit to a field value containing the same temperature reading, but in Celsius. Because a single integration process may transmit field values between or among several sources and destinations, a process flow may include several of these mapping elements, sometimes placed in series with one another. This may result in a single field value receiving several different field names as it moves from various sources to various destinations throughout the integration process. Each of the field values (e.g., field values undergoing one or more mapping functions), and each of the field names associated with these field values may be recorded in metadata associated with the field values following execution of the integration process modeled at FIG. 3.

A connector element 312a may operate in a similar manner to the start element 302 to define an action to be taken on an identified data set. Connector elements (e.g., 312a, 312b) in an embodiment may differ from start elements (e.g., 302) in that they do not necessarily occur at the beginning of an integration process. The stop element 314a in an embodiment may operate to terminate the integration process for field values that have not been marked as PII data (e.g., as routed toward map element 308a via decision element 306a).

As described above, decision element 306a may operate to route field values marked as containing PII to decision element 306b. A decision element 306b in an embodiment may provide one or more security measures to protect data marked as PII data from unsecure transfer to a specifically identified geographic location, trading partner, or application.

Decision element 306b may operate to determine which security measure to apply to the incoming field value. For example, the PII recommendation system in an embodiment may associate the incoming field value with a masking function operating to redact or remove a portion or the entirety of a field value. Such a masking function in some embodiments may be selected or applied by the user, via the migration mapping graphical user interface described with reference to FIG. 4. In other embodiments, the PII recommendation system may suggest or apply such a masking function based on masking functions previously selected or applied by users via the migration mapping GUI. Field values that are wholly masked or redacted in such a fashion in an embodiment may still migrate a field value, but it may be an empty or null field value, or it may replace numerical or text values with symbolic characters such as an "X" or a "0". In these embodiments, the field value to which the masking function has been previously applied may have been migrated pursuant to the same integration process modeled within FIG. 3, a different integration process executed by the same user, or a different integration process executed by a separate user (e.g., crowd-sourced across all users of the integration process modeling GUI and migration mapping GUI). If the field value incoming to decision element 306b during execution of the modeled integration process is associated with a masking function within the metadata for the field value, the decision element 306b may route the field value to the mapping element 308b for application of the masking function to redact a portion or the entirety of the field value.

A map element 308b in an embodiment may apply the masking function associated with the incoming field value that has been marked as PII data. As described directly above, the masking function applied may be selected by the user via the migration mapping GUI described with reference to FIG. 4, or may be selected or applied by the PII recommendation system based on such user-selections for previously executed integration processes. In an embodiment in which the masking function operates to redact, mask, or remove any portion of the field value, that portion of the field value may be permanently removed from the field value and all associated metadata during execution of the modeled integration process.

A connector element 312b may operate in a similar manner to the start element 302 to define an action to be taken on an identified data set. The stop element 314b in an embodiment may operate to terminate the integration process for field values that have been marked as PII data and are associated with a masking function (e.g., as routed toward map element 308b via decision element 306b).

As described above, decision element 306b may operate to determine which security measure to apply to the incoming field value. In an embodiment in which an incoming field value is marked as PII data, but is not associated with a masking function, the decision element 306b may route the data to an exception element 318, for example. Such an exception element 318 may operate to notify the user that the process has encountered an exception and will terminate transfer of the incoming field value, and may identify the incoming field value. In other words, the integration process may inhibit transfer of field values marked as PII data that are not associated with a masking function. The stop element 314c in an embodiment may operate to terminate the integration process for field values that have been marked as PII data but are not associated with a masking function (e.g., as routed toward exception element 318 via decision element 306b).

This is only one example of a type of security measure that may be applied to the transfer of incoming field values. In other embodiments, a masking function may be applied, as described directly above, or the exception element 318 may be replaced by a third connector element, providing a more secure migration destination (e.g., physical location of a server, trading partner, or application) than that provided at connector elements 312a or 312b. Thus, the PII recommendation system may operate in tandem with the modeled integration process to protect data marked as PII data from unsecure transfer to a specifically identified geographic location, trading partner, or application.

The integration application management system in an embodiment may associate each of the visual elements within the integration process-modeling graphical user interface with a set of code instructions written in a machine-readable, executable format. For example, the integration application management system in an embodiment may associate the start element 302 with a connector code set, written in a human-readable, machine-executable code language (e.g., JSON or XML), that includes code instructions for accessing a field value associated with a user-specified field name defined within the start element 302. Upon generation and storage within a memory of each of the code sets associated with each of the visual elements within the integration process-modeling graphical user interface 300 in an embodiment, the integration application management system may further generate a runtime engine capable of executing each of these code sets.

The integration application management system in an embodiment may transmit the runtime engine and each of the code sets for execution of the integration process modeled by the user via the integration process-modeling graphical user interface for execution of the integration process at a remote location (e.g., behind the firewall of a user's enterprise system/network, or at a node within a cloud computing infrastructure). In such a way, users of the integration process modeling GUI 300 may customize their integration processes by modeling them with these visual elements. Such a modeling process may negate a need for the user to learn the underlying computer language in which the integration process code instructions are actually written.

Figure 4:
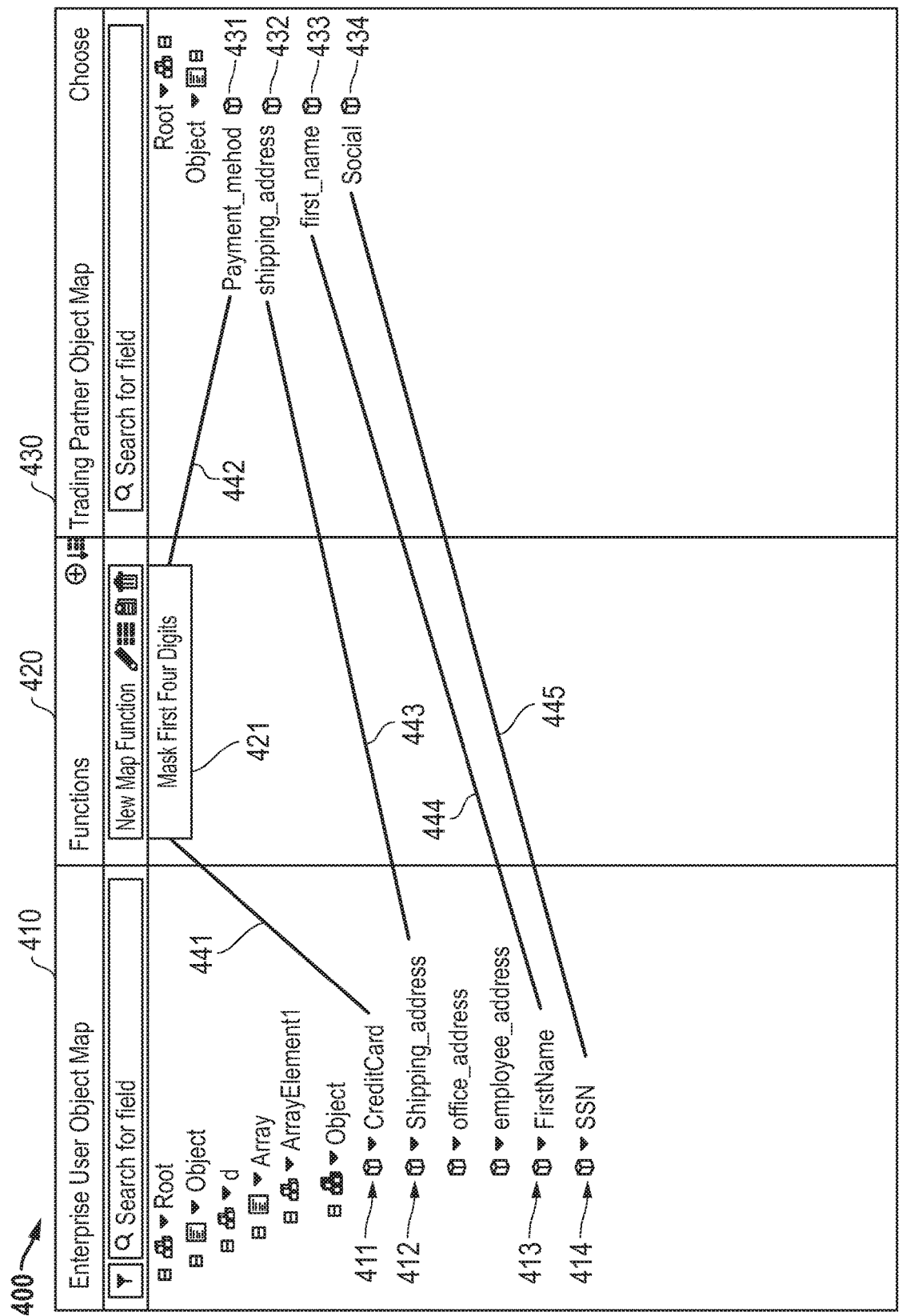
FIG. 4 is a graphical diagram illustrating a migration mapping graphical user interface according to an embodiment of the present disclosure.

FIG. 4 is a graphical diagram illustrating a migration mapping graphical user interface for applying a masking function security measurer other security measures to a field value according to an embodiment of the present disclosure. As described herein, users of the integration process modeling GUI may model several integration processes, some of which may apply security measures to prevent sharing of data containing personal identifiable information (PII). Further, a user may insert a mapping element (e.g., 308a or 308b from FIG. 3) into an integration process flow model in order to define such security measures or to associate a first field name for a field value being retrieved from a first application or source with a second field name under which that same field value will be stored at a second application or destination. The user may be prompted to provide such a security measure definition or such a mapping between field values and field names via the migration mapping GUI 400 in an embodiment.

The migration mapping GUI 400 in an embodiment may illustrate a mapping between multiple field names applied to a single field value throughout execution of a single integration process according to an embodiment of the present disclosure. For example, a single field value (e.g., "John") may be associated with a field name "FirstName" 413 at the source of an integration process, and associated with the field name "first name" 433 at the destination of an integration process. The migration mapping GUI 400 may link these field names (e.g., 413 and 433) via a line or arrow 444 to indicate the both represent the same field value.

In such a way, the migration mapping GUI may represent the relationship between field names associated at a source (e.g., enterprise user) with certain field values, and field names associated at a destination (e.g., trading partner) with these same field values. For example, the migration mapping GUI 400 may include a first column 410 identifying a plurality of source field names (e.g., CreditCard 411, Shipping_address 412, FirstName 413, or SSN 414) where each field name is associated with one or more field values (e.g., a plurality of credit card numbers, a plurality of shipping addresses, a plurality of first names of customers, or a plurality of social security numbers for customers). The migration mapping GUI 400 may further include a column 430 identifying a plurality of destination field names (e.g., payment_method 431, shipping_address 432, first_name 433, or social 434) that may be associated with each of the same field values (e.g., a plurality of credit card numbers, a plurality of shipping addresses, a plurality of first names of customers, or a plurality of social security numbers for customers) upon their storage at the destination location (e.g., trading partner).

The migration mapping GUI 400 may also allow the user to make an association between a field name within column 410 and a field name within column 430, to indicate a single field value may be stored at the source (e.g., enterprise) under the field name shown in column 410 and may be stored at the destination (e.g., trading partner) under the field name shown in column 430 and linked to the field name shown in column 410. For example, the user of the migration mapping GUI 400 may link (e.g., via 443) the field name "Shipping_address" 412 in column 410 to the field name "shipping_address" 432 in column 430 to indicate a single field value (e.g., 123 Main Street) may be stored at the source under the field name "Shipping_address" and at the destination under the field name "shipping_address." As another example, the user of the migration mapping GUI 400 may link (e.g., via 444) the field name "FirstName" 413 in column 410 to the field name "first_name" 433 in column 430 to indicate a single field value (e.g., John) may be stored at the source under the field name "FirstName" and at the destination under the field name "first_name." As yet another example, the user of the migration mapping GUI 400 may link (e.g., via 445) the field name "SSN" 414 in column 410 to the field name "social" 434 in column 430 to indicate a single field value (e.g., 123-45-6789) may be stored at the source under the field name "SSN" and at the destination under the field name "social."

The integration application management system in an embodiment may customize one or more mapping visual elements inserted into the integration process flow model (e.g., as described with reference to FIG. 3), based on the information provided via the migration mapping GUI 400. For example, a mapping element inserted into an integration process flow may operate to change the field name associated with a field value incoming into that mapping visual element to reflect the field name under which that field value will be stored at the destination. More specifically, a mapping element may change a field name "FirstName" associated with a field value "John," which may be incoming from the enterprise, to a field name "first_name," under which it will be stored at the trading partner.

As described herein, the migration mapping GUI 400 in an embodiment may also allow the user to apply a masking function security measure to certain data values. For example, the user of the migration mapping GUI 400 may apply a masking function to all field values associated with the field name "CreditCard" at the source location, using the function column 420 in an embodiment. The user may select the mask function in an embodiment through any known means of user input, including inputting text, choosing from a drop-down list, or searching for certain key terms. Upon choosing the mask function, in an embodiment, the user may further choose, in a similar manner, a specific type of masking. For example, the user may choose to apply a mask function that masks, redacts, or removes the first four digits of a field value by selecting the mask function "mask first four digits" 421. The user may then identify the field values to which this masking function should be applied by linking one of the field names in column 410 and one of the field names in column 430 to the masking function 421. For example, the user may apply the masking function 421 to the field name "CreditCard" 411 via 441, and to the field name "Payment_method" 431 via 442. In such a way, the user may indicate all field values stored at the source/enterprise under the field name "CreditCard" 411 should be redacted by masking or removing the first four digits of the field values, prior to storage of those redacted or masked field values under the field name "Payment_method" 431 at the destination/trading partner.

The masking function selected by the user in an embodiment may be associated with code instructions, managed and stored at the service provider server/system. In some embodiments, such a masking function may mask information (e.g., by replacing text or numbers with symbols such as "X," "–," "?," or "0") or remove information by deleting text or numbers from the field value entirely while the field value is in temporary storage, prior to transfer to the destination. In such an embodiment, such a redaction may not affect the field value as it as stored in permanent storage at the source. In other aspects of an embodiment, such a masking or removal of information may be applied to the entirety of the field value, or a portion of the field value (e.g., text containing specific terms, text or numbers adhering to an identified pattern or format, or numbers having a specific location within a number string such as the first four digits, or last four digits). Each of these different types of masking or redaction may be associated with a separate label (e.g., "mask first four digits," "mask PII terms," or "mask last four digits") at 421 in column 420 of the migration mapping GUI 400. Each of these different types of masking options may also be associated with code instructions for executing such a masking function. Upon execution of the integration process modeled using the integration process modeling GUI in an embodiment, the code instructions associated with one or more of the mapping elements inserted into the integration process flow model may operate to mask the first four digits, or other number of digits or characters (or apply some other form of user-selected redaction), prior to transfer of the field values to which the user applied the masking function.

Field values to which a user has applied a masking function may be associated with metadata identifying this applied masking function. For example, metadata for a field value having a field name "CreditCard" 411 at the source location may identify the masking function "Mask first four digits" 421. As described herein, the PII recommendation system in an embodiment may suggest users of other integration processes (in which a user has not selected a masking function) apply this same masking function to certain field values not yet migrated pursuant to an integration process. For example, a user may model a first integration process that applies the masking function "mask first four digits" 421 to field values having a field name "CreditCard" 411 during execution of a first integration process, generating metadata for those field values that identify the masking function "mask first four digits" 421. The same or another user may then model a separate or second integration process for migration of a different dataset (e.g., not containing the same field values having the field name "CreditCard" 411 that were migrated during the first integration process).

In such a scenario, the PII recommendation system may analyze the metadata associated with one or more migrated field values migrated during the first, previously executed integration process, and metadata associated with one or more unmigrated field values identified in the second, unexecuted integration process. Based on this analysis, the PII recommendation system may determine an unmigrated field value is sufficiently similar to a previously migrated field value to indicate they should receive the same security treatment. For example, the PII recommendation system may determine an unmigrated field value associated with a field name "CC_number" within a modeled but not yet executed integration process is sufficiently similar to a migrated field value associated with the field name "CreditCard" 411 within a previously executed integration process to indicate these two field values should receive the same masking function. In an embodiment, the PII recommendation system may apply an unsupervised vector quantization method to the term frequency vectors generated for each of the migrated field value and the unmigrated field value to determine that these term frequency vectors fall within a preset similarity threshold (e.g., 0.3%, 0.5%. 1%, etc.). For example, the PII recommendation system in an embodiment may apply a k-means clustering method to make such a determination.

Upon determining the unmigrated field value and the migrated field value are sufficiently similar in an embodiment, the PII recommendation system may reference the metadata for the migrated field value to identify a masking function or other security measure function that was applied to that field value during execution of the first, previously executed integration process. For example, the PII recommendation system in an embodiment may determine the masking function "mask first four digits" 421 was applied to the migrated field value associated with the field name "CreditCard" 411 during the previously executed integration process. In such an embodiment, the PII recommendation system may then recommend the user modeling the second, unexecuted integration process apply the same masking function "mask first four digits" 421 to the field value associated with the field name "CC_number" in the second, unexecuted integration process. In such a way, the PII recommendation system in an embodiment may recommend security measures based on the type of PII data identified within the field value that may be similar to previously masked field values containing PII data.

FIG. 5A is a graphical diagram illustrating a migrating dataset explorer user interface 500 for reviewing a dataset for migration that includes a plurality of field values according to an embodiment of the present disclosure. As described herein, a user may model an integration process for migrating data using the integration process modelling GUI (e.g., as described with reference to FIG. 3). The data migrated during execution of such an integration process may include a plurality of field values, each associated with a field name. A corpus of the field values to be migrated during execution of a single integration process may be referred to herein as a migrating dataset.

A migrating dataset for an integration process that has been previously executed, such that the dataset for that integration process has already been migrated between a source and a destination, may be referred to herein as a migrated dataset (e.g., indicating the dataset has been previously migrated), or as a test migrated dataset (e.g., indicating the previously migrated dataset may be used to train a neural network). In an embodiment in which a user repeatedly executes the same integration process, reviewing high-level statistics for a previously executed integration process, displayed via the migrating dataset explorer 500, may allow the user to ensure future executions of the integration process effectively apply security measures to PII data.

A migrating dataset that is set for migration during execution of an integration process that has not yet been executed, but is modeled using the integration process modelling GUI, may be referred to herein as an unmigrated dataset. Reviewing high-level statistics for an integration process that has not yet been executed, as displayed via the migrating dataset explorer 500 prior to execution of the integration process may also allow the user to ensure future execution of the integration process effectively applies security measures to a more complete set of PII data The migrating dataset explorer GUI 500 in an embodiment may operate to display the contents of either a migrated dataset or an unmigrated dataset. In both of these scenarios, the migrating dataset explorer GUI 500 may display the field values for the dataset (e.g., migrated dataset or unmigrated dataset) and their associated field names, as they are stored at the source for the integration process. Because the integration process does not affect the field values as they are stored at the source location during execution, the information displayed via the migrating dataset explorer GUI 500 in an embodiment may remain consistent, regardless of whether the integration process operating to migrate the dataset containing the field values has been executed previously. Thus, for purposes of brevity, field values discussed with reference to FIGS. 5A, 5B, and 5C may be referred to as field values, but may actually represent migrated field values (included within a previously migrated dataset or test migrated dataset), or may represent unmigrated field values (included within an unmigrated dataset set for migration via a not yet executed integration process).

The migrating dataset explorer GUI 500 in an embodiment may display one or more field values and their corresponding field names. Field values may, in some embodiments, be grouped into columns, based on their field names. For example, column 510 may include a plurality of field values (e.g., "public," "REST," or "googleanalytics") representing data transfer protocols or sources, all of which may be associated with a field name "Source." As another example, column 520 may include a plurality of field values (e.g., "123 Main St. Austin, TX," "123 Congress Ave. Austin, TX," or "123 Campus St. Austin, TX") representing physical addresses, all of which may be associated with a field name "ShippingAddress." As yet another example, column 530 may include a plurality of field values (e.g., "Aug. 3, 2018 2:30 pm," "Sep14, 2000 6:00 am," or "Jan. 30, 2010 5:12 pm") representing dates and times, all of which may be associated with a field name "date." In still another example, column 540 may include a plurality of field values (e.g., "123-45-6789," "135791357," or "987 65 4321") representing social security numbers, all of which may be associated with a field name "SSN." As yet another example, column 550 may include a plurality of field values (e.g., "1234-567-8901," "0123-456-7890," or "9876-543-2109") representing payment account numbers (e.g., credit card numbers), all of which may be associated with a field name "CC_number."

The field values given in a column shown in the migrating dataset explorer GUI 500 in an embodiment may adhere to field value type, as defined by an administrator of the migrating dataset explorer GUI 500. Such field value types may include, for example, string (e.g., representing text), floating point number (e.g., representing real numbers in decimal format), and integer (e.g., representing positive or negative whole numbers), which are widely known data types. For example, the field values associated with the "Source" column 510, the "ShippingAddress" column 520, and the "date" column 530 may all adhere to the string format, indicated by the graphic "abc," or "string." Thus, any application accessing the field values listed in columns 510, 520, or 530 may be read as containing text, rather than a real or whole number. As another example, one or more field values (e.g., "135791357") associated with the "SSN" column 540 may adhere to the integer format, indicated by the graphic "123," or "integer," such that any application accessing those field values may be read those field values as containing whole numbers, rather than text, or numbers given in decimal format. As yet another example, one or more field values (e.g., "123-45-6789," or "987 65 321") associated with the "SSN" column 540 may adhere to the string format, since the integer format does not support the use of dashes or spaces within the field value.

In some embodiments, field values may have more specific or customized field value types. For example, in an embodiment in which payment information such as credit card numbers are commonly migrated, and thus represented using the migrated dataset explorer GUI 500, field values may adhere to a "CC" field value type, indicating the field values may contain credit card numbers. More specifically, the field values associated with the "CC_number" column 550 in an embodiment may all adhere to the "CC" format, indicating each of the field values included within column 550 contain credit card numbers. As described herein, these customized field value types (e.g., "CC") may be defined by an administrator of the migrated dataset explorer GUI 500, and selected by a user to describe one or more field values, or all field values associated with a specific field name (e.g., listed within a single column such as column 550).

The field value type associated with a field value in an embodiment may be identified within metadata associated with that field value. Applications operating to receive migrated field values may require that the field values adhere to specific field value types in some embodiments. For example, an accounting program may require that certain field values adhere to the floating number field value type. As a consequence, many commonly migrated field values, such as social security numbers, addresses, or payment method account numbers may adhere to the field value type accepted by most applications that handle such data. Thus, the field value type to which a field value adheres may shed light on the type of information stored within the field value. For example, a field value adhering to the integer format may be more likely to include a social security number than an address, which may require inclusion of written text such as street names. As another example, a field value adhering to the string format may be less likely to include a social security number because many applications providing the capability to search across a plurality of social security numbers require that the field value containing those social security numbers adhere to the integer field value type. Further, because certain data (e.g., addresses, social security numbers, and credit card numbers) are more likely to contain PII data, the field value type identified within metadata for a field value may shed light on whether that field value should be marked as PII data. Thus, the PII recommendation system may analyze metadata associated with individual field values in an embodiment to determine a likelihood that the inclusion of certain terms (e.g., data type "CC," column name "SSN") within the metadata indicate the field value should be marked as PII data.

FIG. 5B is a graphical diagram illustrating a migrated dataset explorer GUI 500 for labeling of field values as PII data by a user according to an embodiment of the present disclosure. As described herein, a user may model an integration process such that security measures such as redaction or masking are applied to field values to be migrated pursuant to the modeled integration system. In order for the security measures to be applied to data transfer pursuant to operations modeled in the integration process accurately to protect PII data from inappropriate or unsecure transfer, PII data must be accurately identified such that the security measures may be applied to all PII data during the migration process. This may be the case since the security measures are triggered to apply only to field values that are marked or labeled and identified as PII data. A user modeling an integration process may manually label one or more field values as containing PII in an embodiment via the migrating dataset explorer GUI 500. According to some embodiments herein, the PII recommendation system may recommend and or label one or more field values as containing PII data.

The migrating dataset explorer GUI 500 may provide a PII data summary box 570 listing one or more field names that are applied to a plurality of field values. For example, the PII data summary box 570 in an embodiment may list each of the columns identifying field names of the dataset, including "source," "ShippingAddress," "Date," "SSN," and "CC_number." In other embodiments, the PII data summary box 570 may list individual field values, rather than the field name applied to that field value. For example, the PII data summary box 570 may list the field values "public," "123 Main St. Austin, TX," "Aug. 3, 2018 2:30 pm," "123-45-6789," or "1234-567-8901." The PII data summary box 570 may further provide the field value type associated with each of these field values or field names. For example, the PII data summary box 570 may identify the "Source" column 510, the "ShippingAddress" column 520, and the "date" column 530 as adhering to the string field value type, identify the "SSN" column 540 as adhering to the integer field value type or the string field value type, and identify the "CC_number" column 550 as adhering to the "CC" customized field value type.

The PII data summary box 570 may also provide a method for the user to mark or label one or more field values as containing PII data in an embodiment. For example, the PII data summary box 570 may include a check box (e.g., 571 or 572) beside each identified field value or field name that the user may select to label or mark that field value or field name as containing PII data. A user in such an embodiment may label or mark a field name as containing PII data by clicking the box (e.g., 571 or 572) beside the field name to cause the migrating dataset explorer 500 to display a check mark or other affirmative notice of selection. For example, the user may select the box 571 to affirmatively mark or label the field name "ShippingAddress" as containing PII data. This may effectively label or mark every field value (e.g., "123 Main St. Austin, TX," "123 Congress Ave. Austin, TX," or "123 Campus St. Austin, TX") associated with this field name (e.g., "ShippingAddress") as containing PII data. This is only one example of a method by which a user may label a field value or field name as containing PII data. It is contemplated that any selection means known in the art may be used, including the user highlighting the field value or field name or selecting a hyperlink for the field value or field name, the user manually entering the field value or field name, or the user selecting the field value or field name from a drop-down menu.

A sample statistics box 560 in an embodiment may provide high level statistics about the dataset illustrated within the migrated dataset explorer GUI 500. The dataset illustrated in the migrated dataset explorer GUI 500 may include each of the field values displayed within FIG. 5A. The sample statistics box 560 in an embodiment may, for example, list the number of columns or field names within the migration dataset, as well as the number of those columns or field names that have been marked as containing PII data. For example, the sample statistics box 560 in FIG. 5A indicates the dataset displayed via the migrated dataset explorer GUI 500 contains five columns (e.g., 510, 520, 530, 540, and 550), with one column (e.g., "ShippingAddress") having been marked as containing PII data.

The PII recommendation system in an embodiment may also recommend that one or more field values be marked as PII data. For example, the PII recommendation system in an embodiment may recommend that all field values associated with the field name "CC_number" be marked or labeled as containing PII data. The PII recommendation system may visually display such a recommendation by prompting the user to select the recommended field name for labeling or marking as PII data. For example, the PII recommendation system in an embodiment may display a question mark within the box 572 beside the field name "CC_number" in order to prompt the user to either select or deselect the field name "CC_number" as containing PII data. It is contemplated that any visually prompt or suggestion means known in the art may be used in an embodiment, including the PII recommendation system highlighting the field value or field name, displaying the box (e.g., 572) beside the field name (e.g., "CC_number") in a specific color or highlighting (e.g., yellow) indicating the suggestion, pre-checking box 572 (and requiring confirmation) in some embodiments, or displaying a pop-up message recommending the field name be selected as containing PII data. As described in greater detail with respect to FIGS. 5C and 6, the PII recommendation system may make such a suggestion based on analysis of metadata (e.g., identifying a field name or data field value type) associated with each of the field values within the migrating dataset displayed via the migrating dataset explorer GUI 500. Because the PII data summary box 570 in an embodiment displays column names (representing field names), or specific field values (not shown), the PII data summary box 570 recommends application of a PII data label, or allows for user selection of such an application to individual field values or to all field values in a given column (e.g., all field values associated with a single field name). As described with reference to FIGS. 5C and 6, the PII recommendation system in an embodiment may further allow a user to apply a PII data label to a plurality of field values whose metadata or data contents contain a specific term or plurality of terms.

Figure 5C:
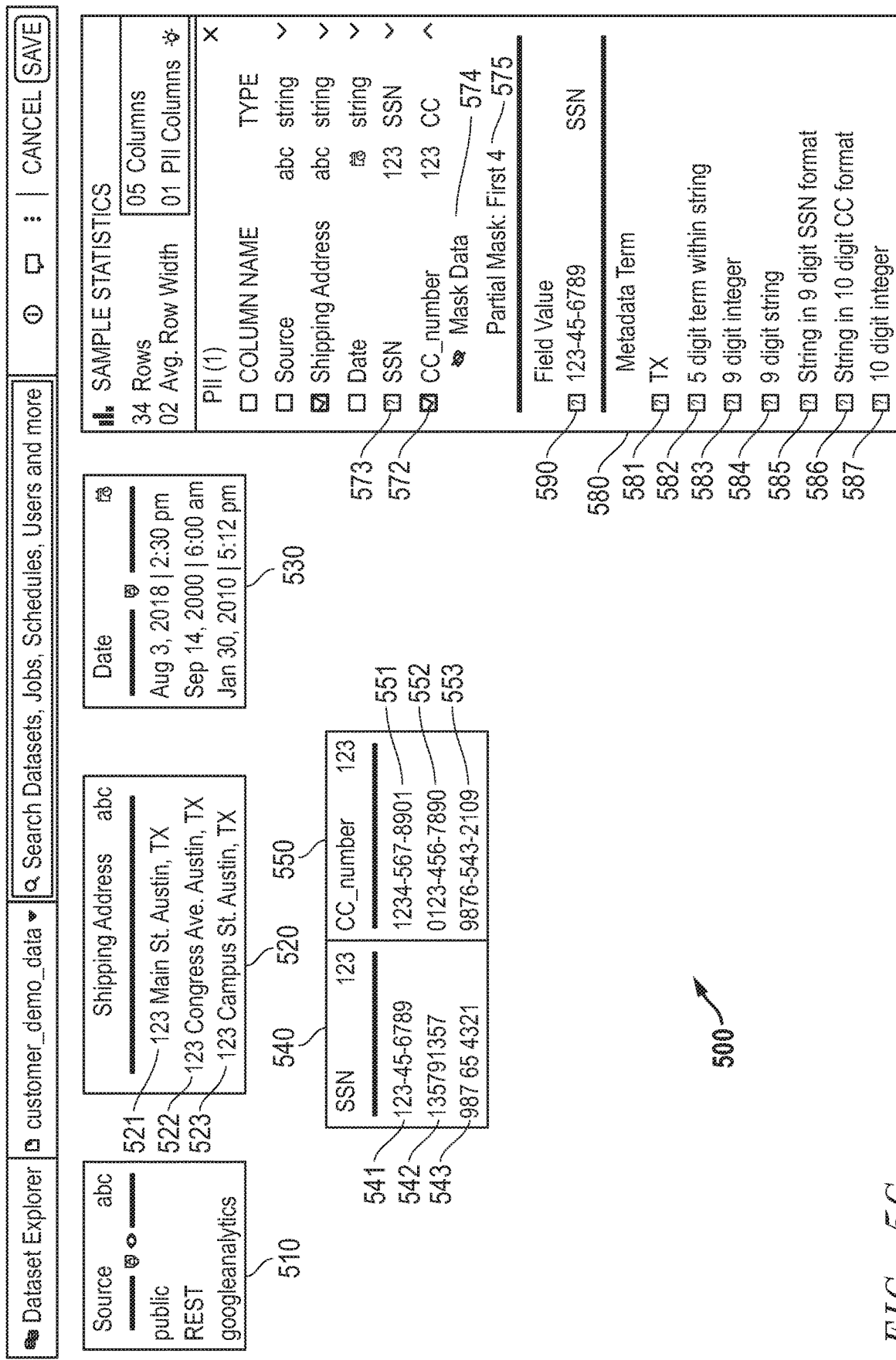
FIG. 5C is a graphical diagram illustrating a migrating dataset explorer GUI 500 for recommending PII labeling according to an embodiment of the present disclosure.

FIG. 5C is a graphical diagram illustrating a migrating dataset explorer GUI 500 for recommending PII labeling based on terms included within metadata for a field value according to an embodiment of the present disclosure. As described herein, the PII recommendation system in an embodiment may suggest the labeling of specific field values as containing PII data, based on comparison by a feed-forward neural network of metadata terms for, or terms within the contents of previously migrated PII field values (e.g., test migrated field value marked or labeled by the user as containing PII), and metadata terms for unmigrated field values to be migrated in the future. Such a neural network may be trained to associate certain metadata terms for a test migrated field value (that has been previously migrated) with a greater or lesser likelihood the test migrated field value contains PII data. By inputting the metadata terms for an unmigrated field value into such a trained neural network, the PII recommendation system in embodiments described herein may determine the probability that the unmigrated field value also contains PII data in order to classify a field value as containing PII data.

Figure 6:
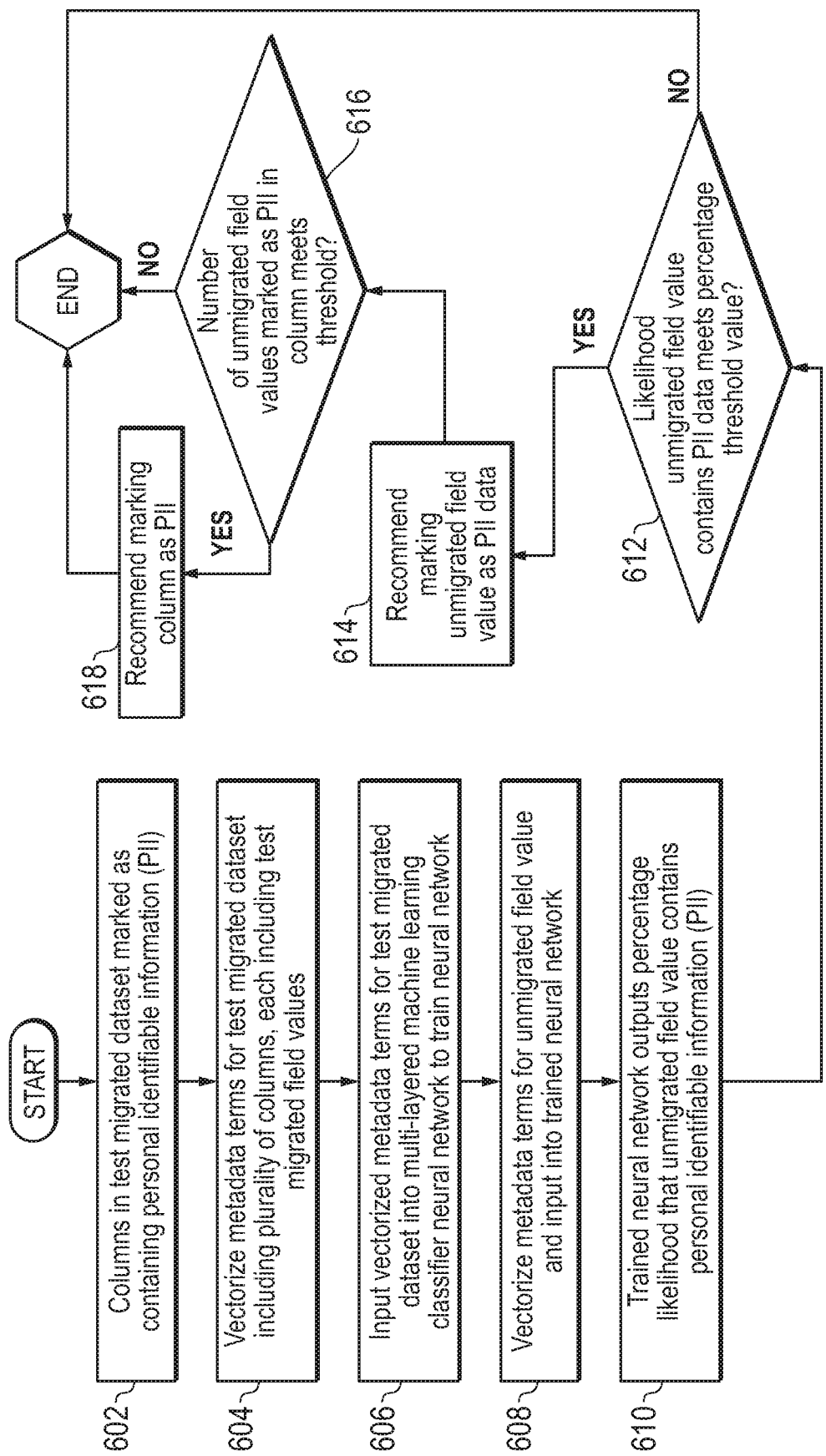
FIG. 6 is a flow diagram illustrating a method of identifying unmigrated field values meeting a probability of containing PII data according to an embodiment of the present disclosure.

Upon determining the unmigrated field value likely contains PII data, as described in greater detail with respect to FIG. 6, the PII recommendation system in an embodiment may suggest the user mark an individual unmigrated field value as likely containing PII data. For example, the PII recommendation system in an embodiment may suggest at box 590 that the user label the individual unmigrated field value "123-45-6789," also given at 541 within the "SSN" column 540 as containing PII data. In another example embodiment, the PII recommendation system may highlight the unmigrated field value, insert a comment linked to the individual unmigrated field value, pre-check box 590, or otherwise notify the user of a suggestion to mark the unmigrated field value as containing PII data. If the user accepts the recommendation of the PII recommendation system (e.g., by clicking on box 590 until a check mark appears) or confirming or keeping a pre-selected check at 590, the PII recommendation system may update the metadata associated with the unmigrated field value 541 to indicate it contains PII data, in various embodiments.

As described herein, the PII recommendation system in an embodiment may train the neural network to determine likelihood that inclusion of any term included within metadata for an unmigrated field value (or combination of such terms) indicates the field value contains PII data. The metadata in an embodiment includes the contents of the unmigrated field value (e.g., 123 Main St. Austin, TX), and the PII recommendation system is trained, at least partially, based on analysis of metadata for field values that contain unstructured or unformatted text (e.g., sometimes referred to in the art as "text blobs"). Thus, the PII recommendation system in an embodiment may train the neural network to determine a likelihood that inclusion of a term (e.g., Austin, or TX) given in unstructured format within a field value (e.g., 123 Main St. Austin, TX) indicates the field value contains PII data. As a consequence, the PII recommendation system in an embodiment may allow a user to apply a PII data label to a plurality of field values whose metadata contains a specific term or plurality of terms. Selection, non-selection, or confirmation or rejection of recommended PII labeling may be input into the neural network to further train the neural network to classify PII data within field values.

These terms that indicate a high likelihood of containing PII data may be listed, in an embodiment, within the metadata term box 580. The PII recommendation system in an embodiment may suggest the user select one or more metadata terms for PII data labeling or marking. For example, the PII recommendation system may analyze the metadata associated with the field value 521 including the entry "123 Main St. Austin, TX" and the metadata associated with the field value 522 including the entry "123 CongressAustinTX" to determine that inclusion of the term "TX" anywhere within a field value likely indicates the field value contains PII data (e.g., an address). In such an embodiment, the PII recommendation system may suggest at box 581 that the user select the metadata term "TX" as indicating the presence of PII data. If the user selects the box 581 to confirm this suggestion in an embodiment, the PII data recommendation system may then label or mark each of the plurality of field values that include the term "TX" as containing PII data (e.g., by inserting an identification as PII data within metadata associated with the plurality of field values). In other embodiments, the PII recommendation system in an embodiment may perform a similar method to suggest marking any field values containing the postal code abbreviation for any of the U.S. states, or containing widely used postal abbreviations for thoroughfares (e.g., "St.," "Ave.," "Hwy.," etc.) as containing PII data.

In some embodiments, the PII recommendation system may suggest marking or labeling a field value as PII data based on a combination of terms found in associated metadata or in data within the field value. For example, the PII recommendation system in an embodiment may suggest at box 582 that the user select any five-digit metadata term given within a field value adhering to the string data field value type as indicating the presence of PII data. Field values containing numbers and letters, letters, or any other non-numerical value may adhere to the string data field value type. Thus, field values containing addresses almost certainly adhere to the string data field value type (or a customized data field value type set by the administrator). A five-digit numerical value (e.g., 78705) inserted within a field value (e.g., "123 Campus St. 78705" given at 523) adhering to the string data field value type in an embodiment may indicate a zip code, for example. If the user selects the box 582 to confirm this suggestion in an embodiment, the PII data recommendation system may then label or mark each of the plurality of field values adhering to the string data field value type that include a five-digit numerical term as containing PII data.

As another example, the PII recommendation system in an embodiment may suggest at box 583 that the user select any nine-digit metadata term given within a field value adhering to the integer data field value type as indicating the presence of PII data. A nine-digit numerical value (e.g., "135791357" given at 542) inserted within a field value adhering to the integer data field value type in an embodiment may indicate a social security number, for example. If the user selects the box 583 to confirm this suggestion in an embodiment, the PII data recommendation system may then label or mark each of the plurality of field values adhering to the integer data field value type that include a nine-digit numerical term as containing PII data.

As yet another example, the PII recommendation system in an embodiment may suggest the user select metadata terms found in field values adhering to the string data field value type based on the number of digits in the numerical metadata term, or based on the formatting of the numerical metadata term. Field values containing spaces, or hyphens cannot adhere to the integer data field value type. Thus, field values containing social security numbers or credit card numbers that include hyphens or spaces may adhere to the string data field value type rather than the integer data field value type. However, many of these field values representing social security numbers or credit card numbers, for example, have commonly used formats. For example, social security numbers including hyphens may include nine digits, where a hyphen or a space separates the third and fourth digits and the fifth and sixth digits. This may be represented in FIG. 5C as "SSN format." As another example, credit card numbers including spaces or dashes may include a ten-digit number where a space separates the fourth and fifth digits and the seventh and eighth digits. This may be represented in FIG. 5C as "CC format." These are only a few examples of commonly used formatting for numerical values given in the string data field value type and are meant to be illustrative rather than limiting.

The PII recommendation system may recommend at box 584 that the user select any nine-digit metadata term given within a field value adhering to the string data field value type as indicating the presence of PII data. A nine-digit numerical value (e.g., "123-45-6789," or "987 65 4321") inserted within a field value (e.g., 541 or 543, respectively) adhering to the string data field value type, where some of the numbers are separated by spaces or hyphens in an embodiment may indicate a social security number, for example. Similarly, the PII recommendation system may recommend at box 585 that the user select any nine-digit metadata term written in the "SSN format" within a field value adhering to the string data field value type as indicating the presence of PII data. A nine-digit numerical value (e.g., "123-45-6789," or "987 65 4321") inserted in the "SSN format" (e.g., where the third and fourth digits and fifth and sixth digits are separated from one another by a dash or space) within a field value (e.g., 541 or 543, respectively) adhering to the string data field value type in an embodiment may indicate a very high likelihood that the field value contains a social security number, for example.

The PII recommendation system may recommend at box 587 that the user select any ten-digit metadata term given within a field value adhering to the string data field value type as indicating the presence of PII data. A ten-digit numerical value (e.g., "1234-567-8901," "0123-456-7890," or "9876-543-2109") inserted within a field value (e.g., 551, 552, or 553, respectively) adhering to the string data field value type, where some of the numbers are separated by spaces or hyphens in an embodiment may indicate a credit card number, for example. Similarly, the PII recommendation system may recommend at box 586 that the user select any ten-digit metadata term written in the "CC format" within a field value adhering to the string data field value type as indicating the presence of PII data. A ten-digit numerical value (e.g., "1234-567-8901," "0123-456-7890," or "9876-543-2109") inserted in the "CC format" (e.g., where the fourth and fifth digits and seventh and eighth digits are separated from one another by a dash or space) within a field value (e.g., 551, 552, or 553, respectively) adhering to the string data field value type in an embodiment may indicate a very high likelihood that the field value contains a credit card number, for example.

The PII recommendation system in embodiments may prompt the user of the migrating dataset explorer GUI 500 to label an entire column of field values as containing PII data if the PII recommendation system determines a sufficient number of the field values within that column should be marked as PII data. In other words, if a sufficiently high number of field values associated with the same field name (e.g., "SSN") are identified as likely containing PII data by the neural network, the PII recommendation system in an embodiment may suggest all field values associated with that field name (e.g., "SSN") be marked as containing PII data. For example, at block 573, the PII recommendation system in an embodiment may recommend the user apply the PII data label to all field values (e.g., 541, 542, and 543) having a field name "SSN," and thus listed in column 540. Although FIG. 5C illustrates the PII recommendation system making such a recommendation for the "SSN" column 540, this recommendation of applying a PII data label to a plurality of field values sharing the same field name could be made based on any field name in the migrating dataset (e.g., source 510, ShippingAddress 520, Date 530, or CC_number 550).

Upon application of the PII data label or marking to an unmigrated field value in an embodiment, the PII recommendation system may further recommend one or more security measures to apply to that unmigrated field value during execution of the integration process for migrating that unmigrated field value. For example, the PII recommendation system may identify a masking function or method of partially or wholly redacting PII data given within an individual field value. Such a recommendation may be made based on an identification of masking functions applied in the same or other integration processes to similar field values. The determination of such a "similarity" in embodiments may be made by the PII recommendation system using an unsupervised vector quantization method, such as, for example, a K-means clustering algorithm applied to the field value metadata properties of several field values.

In such a way, the PII recommendation system in embodiments may suggest masking functions or redaction methods to apply to field values identified as containing PII data, in order to inhibit unsecure transfer of personal information. For example, upon the user confirming the suggestion that field values having a field name "CC_number" should be marked as PII data (e.g., by affirmatively checking box 572), the migrating dataset explorer GUI 500 in an embodiment may provide a drop-down menu of the types of security measures suggested by the PII recommendation system for field values having a field name "CC_number." More specifically, the migrating dataset explorer GUI 500 in an embodiment may allow the user to select "mask data" at 574. In other embodiments, the migrating dataset explorer GUI 500 may allow the user to select other security measures, such as "stop transfer," or "change destination to secure location," for example.

As described herein with respect to FIG. 4, users may choose specific methods of masking or redacting field values. For example, as shown in FIG. 4, the user may have applied a masking method that only masks the first four digits of a migrated field value within a previously migrated dataset. The PII recommendation system may determine, in an embodiment, that the metadata for the unmigrated field values having the field name "CC_number," given within the unmigrated dataset displayed in FIG. 5C are sufficiently similar to the migrated field values within the previously migrated dataset to which the user applied the partial masking method (e.g., mask first four digits) as displayed in FIG. 4. As described herein, the PII recommendation system may make this determination using an unsupervised vector quantization method such as K-means clustering, for example. Upon determining the metadata for the unmigrated field values of FIG. 5 are sufficiently similar to the metadata for the migrated field values of FIG. 4, the PII recommendation system in an embodiment may suggest at 575 that the user apply the same masking methodology (e.g., mask first four digits) applied to the migrated field values of FIG. 4 (e.g., at 421) to the unmigrated field values (e.g., 551, 552, and 553) of FIG. 5 having the field name "CC_number." In such a way, the PII recommendation system in an embodiment may automatically recommend specific types of security measures commonly used by other users in similar circumstances to protect similar PII data.

FIG. 6 is a flow diagram illustrating a method of identifying unmigrated field values to be classified as likely containing PII data, based on metadata or field value data content terms for the unmigrated field value according to an embodiment of the present disclosure. As described herein, integration processes may apply security measures to prevent sharing of PII data. In order for such security measures to accurately and effectively inhibit the sharing of personal identifiable information, unmigrated field values containing PII data must be accurately labeled as such. As shown in FIG. 6, the PII recommendation system in an embodiment may apply a trained neural network to a vectorized representation of metadata for an unmigrated field value in an embodiment, in order to determine a likelihood that the unmigrated field value includes PII data. Such metadata may include the actual contents of the field values, such that the contents of the field value are also vectorized in such a way.

At block 602, a user may mark or label a plurality of test migrated field values (e.g., within a single column of a test migrated dataset) as containing PII data. For example, in an embodiment described with reference to FIG. 5B, the PII data summary box 570 may provide a method for the user to mark or label one or more test migrated field values as containing PII data in an embodiment. More specifically, the PII data summary box 570 may include a check box beside each identified field value or field name that the user may select to label or mark that field value or field name as containing PII data. A user in such an embodiment may label or mark a field name as containing PII data by clicking the box beside the field name to cause the migrating dataset explorer 500 to display a check mark or other affirmative notice of selection. For example, the user may select the box 571 to affirmatively mark or label the field name "ShippingAddress" as containing PII data. This may effectively label or mark every field value (e.g., "123 Main St. Austin, TX," "123 Congress Ave. Austin, TX," or "123 Campus St. Austin, TX") associated with this field name (e.g., "ShippingAddress") as containing PII data.

Upon user labeling of one or more field values as containing PII data, and subsequent migration of those field values pursuant to an integration process, the dataset migrated during execution of that integration process may be considered for use as a test dataset for the training of a neural network. In some embodiments, the PII recommendation system may only train the neural network on a previously migrated dataset if that dataset contains a sufficient number of migrated field values marked as PII data. Training the neural network using only field values containing PII data may result in the neural network over-correlating, or learning an artificially strong correlation between certain metadata terms and a marking as containing PII data. In contrast, training the neural network using datasets that do not contain enough PII data may result in the neural network under-correlating, or learning an artificially weak correlation between certain metadata terms and a marking as containing PII data.

PII recommendation system may exclude previously migrated datasets that do not contain any field values marked as PII from consideration as a test migrated dataset. For example, a previously migrated dataset in an embodiment may only be considered as a test migrated dataset (for the training of the neural network), if the ratio of migrated field values marked as PII within that migrated dataset to migrated field values not marked as PII within that migrated dataset meets or exceeds a preset ratio value. More specifically, a previously migrated dataset in an embodiment may only be considered as a test migrated dataset, if this ratio meets or exceeds 15%. This is only an example preset ratio value. In other embodiments, the preset ratio value may be anywhere between say 5% and 95%, such that the neural network is trained on datasets containing both PII data and non-PII data. If a previously migrated dataset contains previously migrated field values marked as containing PII data sufficient to meet this preset ratio value in an embodiment, the PII recommendation system may identify this previously migrated dataset as a test migrated dataset, and all previously migrated field values within this test migrated dataset as test migrated field values.

The PII recommendation system in an embodiment may vectorize metadata at block 604 for each of the plurality of test migrated field values marked as containing PII data. Vectorizing metadata in such a way may comprise generating a vector that includes a plurality of variables, each representing a weighted frequency with which a single metadata term appears within a totality of metadata for the test migrated dataset that includes the test migrated field value. As described herein, the neural network may correlate a relationship between a given term within metadata for a field value and the PII status (e.g., either containing PII data or not containing PII data) for that field value. The neural network in an embodiment may be trained to model such a relationship between appearance of a given term within metadata for test migrated field value and a known PII status for that test migrated field value, as applied by the user at block 602.

As a first step of such a training process, the PII recommendation system in an embodiment may generate term frequency vector for a single test migrated field value. The term frequency vector in an embodiment is a numerical statistic that is intended to reflect how important a word (e.g., metadata term) is to a document (e.g., test migrated field value) in a collection of documents (e.g., migrated dataset containing the test migrated field value). Using such a weighted numerical statistic in an embodiment may allow the neural network to learn more accurate correlation strengths between metadata terms and PII statuses, by placing more emphasis on metadata terms used more often within the migrated dataset, as represented by the term frequency vector.

This term frequency vector may include a plurality of variables, each variable representing a weighted frequency with which a single metadata term found in the metadata associated with the single test migrated field value appears within the entirety of metadata for the test migrated dataset. For example, the PII recommendation system in an embodiment may apply a term-frequency/inverse-document-frequency (tf-idf) method to the metadata for the single test migrated field value and the metadata for the entirety of the test migrated dataset to determine such a weighted frequency with which the metadata term appears within the single test migrated field value and within the migrated dataset. A tf-idf method in an embodiment may involve determination of a term frequency or the number of times a metadata term (t) appears in the metadata for the single test migrated field value. For example, the term frequency for a given metadata term (e.g., "TX," five-digit number, nine-digit number, ten-digit number, integer, string, SSN, or CC) may be equivalent to the number of times this metadata term appears within the metadata for a single test migrated field value (e.g., "123 Main St. Austin, TX," "123 Campus St. 78705," "135791357," "123-45-6789," or "1234-567-8901").

The tf-idf method may additionally involve, in an embodiment, a determination of an inverse-document-frequency or a weighted percentage of metadata for all test migrated field values that contain the metadata term (t). For example, in an embodiment described with reference to FIG. 5C, the inverse-document-frequency may be equivalent to a weighted percentage of metadata for all test migrated field values shown (e.g., all field values identified within columns 510, 520, 530, 540, and 550) that contain the metadata term (e.g., "TX," five-digit number, nine-digit number, ten-digit number, integer, string, SSN, or CC). Such a weighting may for example, include taking the logarithm of the true percentage. In other words, the inverse-document-frequency in some embodiments may be represented as the logarithm of the percentage of the total number of test migrated field values within the test migrated dataset to the total number of test migrated field values associated with metadata that contains the term (e.g., "TX," five-digit number, nine-digit number, ten-digit number, integer, string, SSN, or CC). It is contemplated the tf-idf method may apply other weighting measures in other embodiments, such as, for example, a unary, smooth, maximum, or probabilistic weighting scheme.

This tf-idf methodology may be repeated for each term identified within the metadata for the single test migrated field value in an embodiment, to generate a vector with several variables. Each variable of the vector in an embodiment may represent the tf-idf weighted frequency for a single term within the metadata for the single test migrated field value. This vector may then be converted into an INDArray in some embodiments. An INDArray, in an example embodiment, may comprise a n-dimensional array (e.g., where n is equivalent to the number of metadata terms for which a weighted frequency has been determined), formatted for processing via a neural network modeled using the Java-based deep learning format (DL4J).

At block 606, the PII recommendation system may input the test vectorized dataset into a multi-layered, feed-forward, machine-learning classifier neural network to train the neural network to correlate a likelihood that presence of any given term within the metadata for the test migrated field values indicates the test migrated field values contain PII data. The PII recommendation system in an embodiment may model a multi-layered, feed-forward, machine-learning classifier neural network in an embodiment, for example, as a deep-learning 4 (DL4) neural network. More specifically, the neural network in an embodiment may comprise a multi-layer perceptron (MLP) classifier neural network. Several such multi-layered feed-forward, machine-learning classifier neural networks exist in the art, and any of these networks may be chosen to model this relationship between metadata terms and PII status in an embodiment. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network.

The neural network may include a plurality of layers, including an input layer, one or more hidden layers, and an output layer. The term frequency vector (e.g., results from a tf-idf methodology to metadata for a single test migrated field value, or an INDArray conversion of such a term frequency vector) may form the input layer of the neural network in an embodiment. These input layers may be forward propagated through the neural network to produce an initial output layer that includes a predicted PII status for the test migrated field value, based on inclusion of each of the metadata terms whose weighted frequencies form the term frequency vector in the input layer. For example, the term frequency vector comprising the input layer may have eight input nodes, with each input node representing one of eight different metadata terms found in the metadata for the test migrated field value. The output layer in such an example embodiment may include eight output nodes, with each output node representing a binary number (e.g., 0 or 1) predicting whether the test migrated field value whose metadata contains the eight metadata terms will comprise PII data (e.g., with 0 indicating no PII data, and 1 indicating inclusion of PII data).

As described herein, because the test migrated field value is included within a previously migrated test dataset, the PII status of the test migrated field value (e.g., 0 or 1) may be known. Each of the output nodes within the output layer in an embodiment may be compared against such a known PII status to generate an error function for each of the output nodes. For example, if the initial output layer predicts the test migrated field value will not contain PII data, and the known PII status of the test migrated field value indicates it does contain PII data, the error function for that output node may have a value of one (e.g., subtracting the value zero of the output node from the known value of one). As another example, if the initial output layer predicts the test migrated field value does contain PII data, and the known PII status of the test migrated field value indicates it does not contain PII data, the error function for that output node may have a value of negative one (e.g., subtracting the value one of the output node from the known value of zero). As yet another example, if the initial output layer accurately predicts the test migrated field value PII status, the error function may have a value of zero (e.g., by either subtracting a value of one from a value of one, or by subtracting a value of zero from a value of zero).

This error function may then be back propagated through the neural network to adjust the weights of each layer of the neural network. The accuracy of the predicted PII status associated with each metadata term (as represented by each of the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for each of the terms accurately predicts the known PII status of the test migrated field value. In such a way, the neural network may be trained to provide the most accurate output layer, including a prediction that the test migrated field value may contain PII data, based on inclusion of each of the metadata terms within the metadata associated with the test migrated field value.

Such a training of the neural network in an embodiment based on known PII status of a single test migrated data field value may comprise a single training session. Such a training session in an embodiment may be repeated for each of the remaining test migrated data field values (each associated with a known PII status) included within a test migrated dataset. In some embodiments, the neural network may similarly undergo other training sessions for each of the plurality of test migrated field values within a second test migrated dataset. In still other embodiments, the neural network may be periodically retrained by undergoing similar training sessions on updated datasets that contain field values having known PII statuses such as with confirmation or rejection of recommended PII labels with use of the PII recommendation system, where the known PII status for one or more of such field values has changed since the most recent training session for the neural network. In such a way, the neural network may be consistently retrained on the most up-to-date information such that it may provide the most accurate recommendations of whether other field values should be marked as containing PII data.

The PII recommendation system in an embodiment may vectorize metadata terms for an unmigrated field value set to be migrated during a future execution of an integration process and input the vectorized metadata terms for the unmigrated field value into the trained neural network at block 608. Once the neural network has been trained, as described directly above, the PII recommendation system may use the trained neural network to determine a likelihood that a field value within a dataset that has not yet been migrated pursuant to an integration process contains PII data. Such a field value within a not yet migrated dataset in an embodiment may be referred to herein as an unmigrated field value, and it may be comprised within an unmigrated dataset. Thus, the trained neural network of the PII recommendation system may be used to identify and generate recommendations to label field values as containing PII data for an integration process before migration of the data.

As a first step in making such a determination, the PII recommendation system in an embodiment may generate term frequency vector for a single unmigrated field value. The PII recommendation system in an embodiment may apply the same methodology used in step 604 (e.g., tf-idf methodology), vectorizing metadata terms for a test migrated field value, to vectorize the metadata terms for the unmigrated field value. This term frequency vector may include a plurality of variables, each variable representing a weighted frequency with which a single metadata term found in the metadata associated with the single unmigrated field value appears within the entirety of metadata for the unmigrated dataset. This vector may also be converted into an INDArray in some embodiments.

At block 610, the trained neural network in an embodiment may output a percentage likelihood that the unmigrated field value contains PII data. For example, the PII recommendation system in an embodiment may enter the term frequency vector for the unmigrated field value into the trained neural network, and forward propagate this term frequency vector through each of the layers of the neural network to output a prediction (e.g., either 0 or 1) at each of the output nodes that the unmigrated field value includes PII data. The plurality of output nodes in an embodiment may include a mixture of different predictions (e.g., a plurality of zeros and a plurality of ones). This may be the case because the inclusion of some metadata terms (each associated with a different input node and output node) within metadata for the unmigrated field value may reflect a higher likelihood that the unmigrated field value contains PII data than other metadata terms. As described above with respect to the test migrated field value, the metadata for the unmigrated field value may include the data contents of the unmigrated field value. For example, a first output node associated with a metadata term "TX," (found within metadata for the unmigrated field value) may be associated with a higher likelihood that the unmigrated field value contains PII data than a metadata term "string." This may be the case because the metadata term "TX" is usually found in field values containing personally identifying addresses, while field values adhering to the string data field value type may include all sorts of information, only a small portion of which is likely to contain PII data.

The PII recommendation system in an embodiment may determine a probability that the unmigrated field value whose term frequency vector has been input into the neural network contains PII data by taking an average or a weighted average of the values of each of the output nodes, for example. Because the output nodes may include a plurality of zeros and ones, as described directly above, the average of these output node values may take the form a percentage value between zero and one hundred percent.

The PII recommendation system in an embodiment may determine whether the probability that the unmigrated field value contains PII data, as determined by the neural network, meets a preset individual labeling threshold value at block 612. The preset individual labeling threshold value in an embodiment may set a threshold value that must be met by the output of the neural network before the PII recommendation system will recommend the unmigrated field value be labeled as PII data. For example, such a threshold value may be 90%, 95%, or 97% in some embodiments. This preset individual labeling threshold value may be set by an administrator or manager of the PII recommendation system in an embodiment. Other embodiments contemplate other preset individual labeling threshold values, such as, for example, 70% or higher. Such a preset threshold may depend on the accuracy required by the administrator or manager.

If the probability that the unmigrated field value contains PII data meets the preset individual labeling threshold value, the method may proceed to block 614 to recommend that the user mark or label the individual unmigrated field value as containing PII data. If the probability that the unmigrated field value contains PII data does not meet the preset individual labeling threshold value, this may indicate the unmigrated field value is not likely to contain PII data, and that the PII recommendation system should not suggest the user mark or label the unmigrated field value as containing PII data. The method as it applies to the unmigrated field value whose metadata was vectorized at block 608 may then end. However, the method of blocks 608-614 may be repeated for any or all unmigrated field values within an unmigrated dataset in order to accurately label all unmigrated field values to be migrated within a future execution of a single integration process as either containing PII data, or not containing PII data.

In an embodiment in which the likelihood the individual, unmigrated field value contains PII data meets the preset individual labeling threshold value, the PII recommendation system may recommend marking the unmigrated field value as containing PII data at block 614. For example, in an embodiment described with reference to FIG. 5C, upon determining the unmigrated field value 541 likely contains PII data, the PII recommendation system in an embodiment may suggest the user mark the individual unmigrated field value 541 as likely containing PII data. More specifically, the PII recommendation system in an embodiment may suggest at box 590 that the user label the individual unmigrated field value "123-45-6789," also given at 541 within the "SSN" column 540 as containing PII data.

At block 616, the PII recommendation system in an embodiment may determine whether a number of unmigrated field values within a single column (e.g., sharing a single field name) or including the same metadata term (e.g., "TX") that have been marked as containing PII data meet a preset group labeling threshold value. The preset group labeling threshold value in an embodiment may include any value sufficient to accurately predict the likelihood that a given field name (defining a column for an unmigrated field value) contains PII data, or that inclusion of a given term within metadata for the unmigrated field value may indicate that the unmigrated field value contains PII data. For example, the preset group labeling threshold value in an embodiment may be 99%, 95%, or 90% for a column or other grouping to be entirely classified as containing PII data. In other embodiments, the preset group labeling threshold value may be 70%. This preset group labeling threshold value may be set by an administrator or manager of the PII recommendation system in an embodiment.

If the number of unmigrated field values marked as containing PII data and sharing a single field name (e.g., a column or other grouping) meets the preset group labeling threshold value, the method may proceed to block 618 to recommend labeling all unmigrated field values sharing a single field name as containing PII data. If the number of unmigrated field values marked as containing PII data and sharing a single field name (e.g., a column or other grouping) does not meet the preset group labeling threshold value, the method as it applies to all unmigrated field values having the same field name as the unmigrated field value whose metadata was vectorized at block 608 may then end. However, the method of blocks 616-618 may be repeated for any or all unmigrated field values sharing another field name (or falling within another column) within the unmigrated dataset.

In an embodiment in which the number of unmigrated field values marked as PII and sharing the same field name meets the preset group labeling threshold value, the PII recommendation system in an embodiment may recommend marking each of the unmigrated field values sharing that same field name (e.g., a column or other grouping) as containing PII data at block 618. For example, in an embodiment described with reference to FIG. 5C, the PII recommendation system in embodiments may prompt the user of the migrating dataset explorer GUI 500 to label an entire column of field values as containing PII data if the PII recommendation system determines a sufficient number of the field values within that column should be marked as PII data. In other words, if a sufficiently high number of field values associated with the same field name (e.g., "SSN") are identified as likely containing PII data by the neural network, the PII recommendation system in an embodiment may suggest all field values associated with that field name (e.g., "SSN") be marked as containing PII data. For example, at block 573, the PII recommendation system in an embodiment may recommend the user apply the PII data label to all field values (e.g., 541, 542, and 543) having a field name "SSN," and thus listed in column 540.

In another aspect of an embodiment, the PII recommendation system may allow a user to apply a PII data label to a plurality of field values whose metadata contains a specific term or plurality of terms. These terms that indicate a high likelihood of containing PII data may be listed, in an embodiment, within the metadata term box 580. The PII recommendation system in an embodiment may suggest the user select one or more metadata terms for PII data labeling or marking. For example, the PII recommendation system may suggest at box 581 that the user select the metadata term "TX" as indicating the presence of PII data.

In some embodiments, the PII recommendation system may suggest marking or labeling a field value as PII data based on a combination of terms found in associated metadata. For example, the PII recommendation system in an embodiment may suggest at box 582 that the user select any five-digit metadata term given within a field value adhering to the string data field value type as indicating the presence of PII data (e.g., a zip code in addition to "TX" or a state designation). As another example, the PII recommendation system in an embodiment may suggest at box 583 that the user select any nine-digit metadata term given within a field value adhering to the integer data field value type as indicating the presence of PII data (e.g., a social security number).

In another aspect of an embodiment, the PII recommendation system may suggest the user select metadata terms found in field values adhering to the string data field value type based on the number of digits in the numerical metadata term, or based on the formatting of the numerical metadata term. For example, the PII recommendation system may recommend at box 584 that the user select any nine-digit metadata term given within a field value adhering to the string data field value type as indicating the presence of PII data. In another example, the PII recommendation system may recommend at box 585 that the user select any nine-digit metadata term written in the "SSN format" within a field value adhering to the string data field value type as indicating the presence of PII data. In yet another example, the PII recommendation system may recommend at box 587 that the user select any ten-digit metadata term given within a field value adhering to the string data field value type as indicating the presence of PII data. In still another example, the PII recommendation system may recommend at box 586 that the user select any ten-digit metadata term written in the "CC format" within a field value adhering to the string data field value type as indicating the presence of PII data. In such a way, the PII recommendation system may suggest marking unmigrated field values as containing PII such that the integration process for transferring such PII data applies security measures defined by the user to such a transfer. The method may then end.

Figure 7:
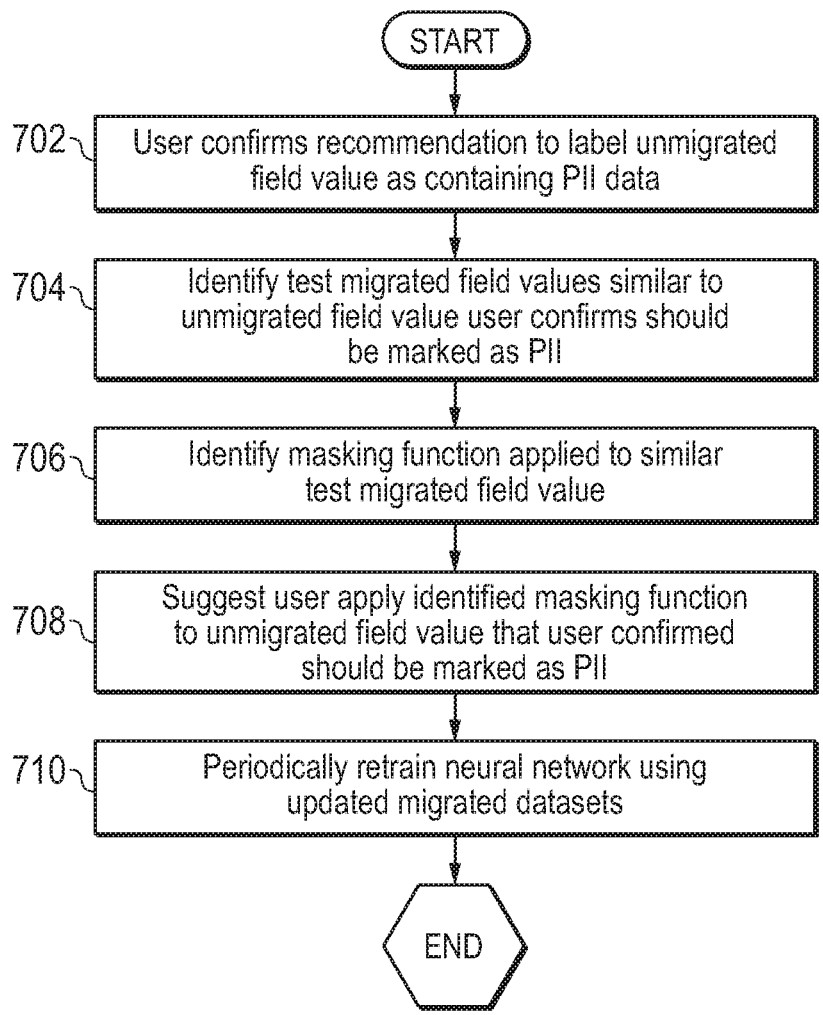
FIG. 7 is a flow diagram illustrating a method of applying security measures to the transfer of unmigrated field values marked as PII data according to an embodiment of the present disclosure.

FIG. 7 is a flow diagram illustrating a method of applying security measures to the transfer of unmigrated field values marked as PII data, as modeled by the integration process for migrating such PII data according to an embodiment of the present disclosure. As described herein, the PII recommendation system in embodiments described herein may assist users of the integration process modeling GUI in identifying an effective security measure to apply to PII data during migration.

At block 702, the user may confirm the recommendation from the PII recommendation system to mark the unmigrated field value as containing PII data. For example, in an embodiment described with reference to FIG. 5C, the user may confirm a suggestion at box 590 to label the unmigrated field value 541 (e.g., "123-45-6789") as containing PII data by clicking on box 590 until a check mark appears. As another example, the user may confirm a suggestion at box 573 to label all unmigrated field values (e.g., 541, 542, and 543) within the "SSN" column 540 as containing PII data by clicking on box 573 until a check mark appears. In yet another example, the user may confirm a suggestion at box 581 to label the unmigrated field values (e.g., 521, and 522) that contain he metadata term "TX" as containing PII data by clicking on box 580 until the check mark appears or leaving a pre-selected check within box 580.

In an embodiment in which the user has confirmed the recommendation to mark the unmigrated field value as containing PII data, the PII recommendation system in an embodiment may update the unmigrated dataset metadata to reflect that the unmigrated dataset contains PII data. For example, upon the user accepting the recommendation of the PII recommendation system (e.g., by clicking on box 590 until a check mark appears), the PII recommendation system may update the metadata associated with the unmigrated field value 541 to indicate it contains PII data. As another example, upon the user accepting the recommendation of the PII recommendation system (e.g., by clicking box 573 until a check mark appears), the PII recommendation system may update the metadata associated with the unmigrated field values 541, 542, and 543 to indicate each of these unmigrated field values contain PII data. In still another example, upon the user accepting the recommendation of the PII recommendation system (e.g., by clicking box 581 until a check mark appears), the PII recommendation system may update the metadata associated with the unmigrated field values 521 and 522 to indicate each of these unmigrated field values contain PII data.

The PII recommendation system in an embodiment may apply an unsupervised vector quantization method at block 704 to identify test migrated field values similar to the unmigrated field value confirmed by the user to contain PII data. The PII recommendation system in an embodiment may use one of a plurality of unsupervised vector quantization methods known in the art to cluster field values (e.g., unmigrated field values or test migrated field values) together, based on the similarity of the metadata terms found in their respective metadata. In an example embodiment, the PII recommendation system may input the term frequency vectors for a plurality of test migrated field values (e.g., as generated at block 604 in FIG. 6) and an unmigrated field value term frequency vector (e.g., as generated at block 608 in FIG. 6) into a K-means clustering algorithm. The K-means clustering algorithm in such an embodiment may output one or more test migrated field values determined to be sufficiently similar to the unmigrated field value such that they are situated within the same cluster.

For example, in an embodiment described with reference to FIG. 5C, the PII recommendation system may determine the test field value 551 within the "CC_number" column 550 is sufficiently similar to a test migrated field value that is also marked as containing PII data, as it contains a credit card number. In an example embodiment, the unmigrated field value and the one or more test migrated field values may be "sufficiently similar" to be placed within the same cluster if the K-means clustering algorithm determines a 0.03% difference or less between the term frequency vector for the unmigrated field value and the term frequency vector(s) for the test migrated field value(s).

At block 706, the PII recommendation system in an embodiment may identify a masking function applied to the test migrated field value identified as similar to the unmigrated field value confirmed by the user to contain PII data. For example, in an embodiment described with reference to FIG. 5C, the PII recommendation system in an embodiment may determine the test migrated field value that has been marked as PII data for containing a credit card number, and which the PII recommendation system identified at block 704 as being similar to the unmigrated field value 551 in the "CC_number" column 550, is associated with a masking function that operates to mask the first four digits of the test migrated field value.

The PII recommendation system in an embodiment may suggest at block 708 that the user apply the identified masking function or other security measure applied to the test migrated field value to the unmigrated field value confirmed by the user to contain PII data. For example, the PII recommendation system in an embodiment may suggest at 574 and 575 of FIG. 5C that the user apply the masking function that operates to mask the first four digits of the test migrated field value (e.g., as applied to the similar test migrated field value) to the unmigrated field value 551, belonging to the "CC_number" column 550. In such a way, the PII recommendation system in embodiments may suggest masking functions or redaction methods to apply to field values identified as containing PII data, in order to inhibit unsecure transfer of personal information.

At block 710, the PII recommendation system in an embodiment may periodically retrain the neural network based on updated PII statuses applied to datasets migrated since the last training session for the neural network. For example, the neural network may be periodically retrained by undergoing training sessions similar to those described with reference to FIG. 6 on updated datasets that contain field values having known PII statuses such as with confirmation or rejection of recommended PII labels with use of the PII recommendation system, where the known PII status for one or more of such field values has changed since the most recent training session for the neural network. In such a way, the neural network may be consistently retrained on the most up-to-date information such that it may provide the most accurate recommendations of whether other field values should be marked as containing PII data. The method may then end.

Figure 8:
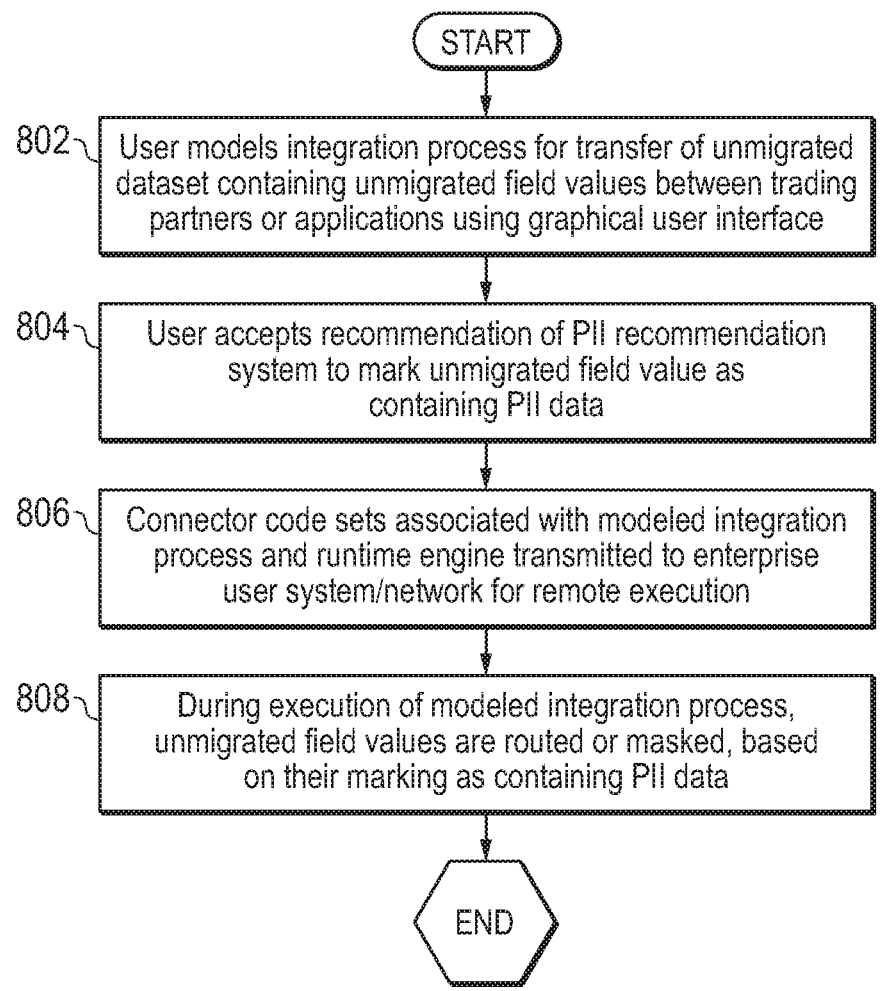
FIG. 8 is a flow diagram illustrating a method of executing an integration process modeled to securely transfer PII data according to an embodiment of the present disclosure.

FIG. 8 is a flow diagram illustrating a method of executing an integration process for migrating a dataset containing a plurality of field values, modeled to apply a security measure to the transfer of an unmigrated field value according to an embodiment of the present disclosure. As described herein, users of the integration process modeling GUI may model several integration processes, some of which may apply security measures to prevent sharing of data containing personal identifiable information (PII).

At block 802, a user of the integration process modeling GUI in an embodiment may model an integration process for the transfer of an unmigrated dataset containing unmigrated field values between trading partners or applications. For example, in an embodiment described with reference to FIG. 3, a user may arrange a plurality of visual elements (e.g., 302, 306a, 306b, 308a, 308b, 312a, 312b, 314a, 314b, 314c, and 318) into an integration process flow via an integration process modeling GUI. Each of the plurality of visual elements in an embodiment may represent a unit of work within an integration process for migrating datasets from one location to another. For example, the decision element 306a may route incoming unmigrated field values marked as containing PII data within the metadata associated with that incoming unmigrated field value to decision element 306b. As another example, the decision element 306b may inhibit the transfer of incoming unmigrated field values marked as containing PII data that are not also associated with a masking function within the metadata associated with that incoming unmigrated field value. As yet another example, the decision element 306b may route the incoming unmigrated field value marked as containing PII data that is associated with a masking function within the metadata associated with that incoming unmigrated field value to the mapping element 308b for application of the masking function. Thus, the process flow modeled at FIG. 3 may operate to stop the transfer of non-redacted or unmasked PII data, and to mask or redact PII data or a portion of PII data selected by a user to be applied to a specific incoming unmigrated field value.

The user in an embodiment may accept a recommendation of a PII recommendation system to mark an unmigrated field value to be migrated during execution of the modeled integration process as containing PII data at block 804. As described herein, the security measures (e.g., masking or inhibiting transfer entirely) that the integration process modeled at block 802 is modeled to apply to PII data may only protect PII data efficiently if the incoming unmigrated field values to be migrated pursuant to the modeled integration process are accurately labeled as either containing PII data or not containing PII data. As described with reference to FIG. 6, the neural network may increase this labeling accuracy by suggesting the user mark specific unmigrated field values as containing PII data, based on the inclusion of certain terms within metadata (which may include the data contents of a field value) for the unmigrated field values. As also described with reference to FIG. 7, the user may accept the recommendation of the PII recommendation system to mark an unmigrated field value as containing PII data at block 702.

At block 806, connector code sets associated with the modeled integration process and runtime engine may be transmitted in an embodiment to the enterprise user system/network for remote execution. The integration application management system in an embodiment may associate each of the visual elements selected by the user to model the integration process for migrating a dataset containing PII data with a set of code instructions written in a machine-readable, executable format. Upon generation and storage within a memory of each of the code sets associated with each of the visual elements within the integration process-modeling graphical user interface 300 in an embodiment, the integration application management system may further generate a runtime engine capable of executing each of these code sets. The integration application management system in an embodiment may transmit the runtime engine and each of the code sets for execution of the integration process modeled by the user via the integration process-modeling graphical user interface for execution of the integration process at a remote location (e.g., behind the firewall of a user's enterprise system/network, or at a node within a cloud computing infrastructure).

During execution of the modeled integration process at block 808, the unmigrated field value marked as containing PII data may be routed or masked, based on their marking as containing PII data. For example, the code instructions or code set associated with the decision elements 306a, 306b, and 308 may operate to mask or redact PII data or a portion of PII data selected by a user to be applied to a specific incoming unmigrated field value. As another example, the code instructions associated with the decision elements 306a, 306b, and 318 may operate to stop the transfer of non-redacted or unmasked PII data. The accurate labeling of incoming unmigrated field values via the PII recommendation system, in tandem with the application of security measures defined by the model flow for the integration process via the integration process modeling GUI in an embodiment may effectively inhibit the unsecure transfer of field values marked as containing PII data during execution of the modeled integration process. In such a way, the PII recommendation system may assist the user of the integration process modeling GUI to apply security measures to the transfer of all field values that may contain PII data during execution of the integration process. The method may then end.

The blocks of the flow diagrams 6-8 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a personal identifiable information (PII) recommendation system comprising:
    a processor executing code instructions for a graphical user interface to model, with visual integration elements including a decision visual integration element to determine security measures to apply to an incoming field value, flow of an integration process for migrating field values of a migrating dataset from a first database having a first data format to a second database having a second data format and partially including PII data to a receiving dataset, wherein the integration process selects and applies a security measure pursuant to determination at the decision visual integration element to determine the security measure selected to apply to the incoming field value from the first database in the first data format to migration of PII data in the modeled flow of the integration process to the second databased in the second data format;
    the processor executing code instructions of the PII recommendation system operating via the decision visual integration element in the modeled flow of visual integration elements for the integration process to:
        generate a first term frequency vector for a first migrating field value, the first term frequency vector describing a weighted frequency with which a metadata term for the first migrating field value appears within metadata terms for the migrating dataset including the first migrating field value;
        input the first term frequency vector into a trained neural network to determine the first migrating field value includes data classified as PII data;
        label the first migrating field value as PII data, such that the modeled integration process applies the security measure selected to the first migrating field value; and
    a network interface device transmitting to a remote location a set of connector code instructions for performing the modeled integration process, and a runtime engine, for remote execution.

2. The information handling system of claim 1, wherein the first field value metadata property identifies one or more words within the first migrating field value.

3. The information handling system of claim 1, wherein the security measure includes the integration process redacting a portion of the first migrating field value during migration of the first migrating field value.

4. The information handling system of claim 1, wherein the security measure includes the integration process inhibiting transmission of the first migrating field value labeled PII from among other field values migrated during execution of the integration process.

5. The information handling system of claim 1 further comprising:
    the processor executing code instructions of the PII recommendation system to:
        display a suggestion that a user label the first migrating field value as PII data via the graphical user interface; and
        receive a user instruction confirming the suggestion.

6. The information handling system of claim 1, wherein the trained neural network is trained using test field values comprising unstructured text.

7. The information handling system of claim 1, wherein the first migrating field value and a plurality of additional migrating field values have matching field names, further comprising:
    the processor executing code instructions of the PII recommendation system to:
        determine a number of the plurality of additional migrating field values marked as PII data exceeds a preset threshold value; and
        label each of the plurality of additional migrating field values as PII data.

8. An information handling system operating a personal identifiable information (PII) recommendation system comprising:
    processor executing code instructions for a graphical user interface to model, with visual integration elements including a decision visual integration element to determine security measures to apply to an incoming field value from a first database having a first data format, flow of a first modeled integration process for migrating field values of a migrating dataset partially including PII data to a receiving dataset from the first database having the first data format to a second database having a second data format, wherein the first integration process includes selecting application of a masking function among a plurality of security measures as a first security measure selected to be applied via the decision visual integration element to migration of migrating field values with PII data in the first modeled integration process;

the processor executing code instructions of the PII recommendation system to operate via the decision visual integration element in the modeled flow of visual integration elements for the integration process to:

generate a first term frequency vector for a first migrating field value of the migrating dataset to be migrated pursuant to the integration process that is visually modeled with the visual integration elements, the first term frequency vector describing a weighted frequency with which a metadata term for the first migrating field value appears within metadata terms for the migrating dataset including the first migrating field value;

input the first term frequency vector into a trained neural network to determine the first migrating field value includes data classified as PII data;

apply an unsupervised vector quantization to the first term frequency vector and a second term frequency vector of a second migrating field value to determine the first migrating field value labeled as PII data and the second migrating field value meet a preset similarity threshold, and determine that the second migrating field value applies the masking function among the plurality of security measures selected as the first security measure and apply the masking function to the first migrating field value; and a network interface device transmitting to a remote location a set of connector code instructions for performing the modeled first integration process, and a runtime engine, for remote execution.

9. The information handling system of claim 8, wherein the unsupervised vector quantization is a k-means clustering algorithm.

10. The information handling system of claim 8, wherein the trained neural network is a multilayer perceptron, feed-forward neural network.

11. The information handling system of claim 8, wherein the first migrating field value metadata term identifies a field value type for the first migrating field value.

12. The information handling system of claim 8, wherein the trained neural network is periodically retrained based on updated migrating datasets including updated migrating field values previously determined by the trained neural network to include PII.

13. The information handling system of claim 8, wherein the second migrating field value is within a second migrating dataset migrated pursuant to a second modeled integration process.

* * * * *